(12) United States Patent
Yang et al.

(10) Patent No.: US 6,362,767 B1
(45) Date of Patent: Mar. 26, 2002

(54) METHODS FOR SIMULTANEOUS ANALOG-TO-DIGITAL CONVERSION AND MULTIPLICATION

(75) Inventors: David Xiao Dong Yang, Palo Alto; Boyd Fowler, Sunnyvale; Abbas El Gamal, Palo Alto, all of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/274,202

(22) Filed: Mar. 22, 1999

(51) Int. Cl.$^7$ ................................................ H03M 1/12
(52) U.S. Cl. ........................ 341/155; 341/169; 348/571
(58) Field of Search ................................ 341/155, 169, 341/170; 348/571, 572

(56) References Cited

U.S. PATENT DOCUMENTS

| | | | |
|---|---|---|---|
| 5,140,591 A | * 8/1992 | Palara et al. ............... | 307/270 |
| 5,264,851 A | * 11/1993 | Yasuda ...................... | 341/158 |
| 5,461,425 A | 10/1995 | Fowler et al. .............. | 348/294 |
| 5,502,440 A | 3/1996 | New .......................... | 341/157 |
| 5,608,314 A | * 3/1997 | Woo .......................... | 323/113 |
| 5,699,004 A | 12/1997 | Picciotto ................... | 327/350 |
| 5,793,319 A | * 8/1998 | Ard ........................... | 341/120 |
| 5,801,657 A | 9/1998 | Fowler et al. .............. | 341/155 |
| 5,982,318 A | * 11/1999 | Yiannoulos ................. | 341/155 |

OTHER PUBLICATIONS

Goldberg, B., The evolution and maturity of fractional–N PLL synthesis, Microwave, Journal, pp. 124–134, Sep. 1996.

* cited by examiner

Primary Examiner—Peguy JeanPierre
(74) Attorney, Agent, or Firm—Lumen Intellectual Property Services, Inc.

(57) ABSTRACT

A method of simultaneously providing A/D conversion and multiplication in a Bit-Serial ADCs and single slope ADCs. A bit serial ADC uses a RAMP signal and a BITX signal input to a comparator and 1-bit latch, respectively. When RAMP exceeds an analog input value, the comparator triggers the latch to output the value of BITX. The bits are output serially. The RAMP signal has a staircase shape with voltage levels and voltage steps. In the present invention, multiplication by two coefficients is possible. One coefficient is determined by properly designing RAMP, and the other coefficient is determined by properly designing BITX. Multiplication via RAMP is accomplished by changing the voltage levels by a factor of 1/X, where X is the multiplying coefficient (i.e., multiplication by a factor of 0.5 is accomplished by doubling the voltage of the voltage levels). Multiplication via BITX is accomplished by slowing the frequency of BITX by a factor of X. Also disclosed are methods of designing BITX and RAMP such that multiplication via BITX has a high accuracy. Also, the present invention includes methods for data compression/filtering in a photodetector array using the disclosed multiplication methods. The present invention is suitable for use in multichannel environments because the invention requires only very simple hardware.

38 Claims, 18 Drawing Sheets

| Truth Table for Fig. 3 ||
| Analog Value Within Range | Digital Output |
| --- | --- |
| A-B | 1 |
| B-C | 0 |
| C-D | 1 |
| D-E | 0 |
| E-F | 1 |

METHODS FOR SIMULTANEOUS ANALOG-TO-DIGITAL CONVERSION AND MULTIPLICATION

FIELD OF THE INVENTION

This invention relates generally to analog-to-digital conversion methods and to methods of performing electronic multiplication. More specifically, the present invention provides a method of performing analog-to-digital conversion simultaneously with multiplication. The invention is particularly well suited for use in data compression of a large number of parallel analog signals. In addition, the present disclosure teaches an architecture for performing a separable transform on a 2-dimensional imaging sensor array.

BACKGROUND OF THE INVENTION

Imaging sensor arrays such as charge coupled devices (CCDs) or photodiode arrays are commonly used in imaging applications such as machine vision or digital cameras. Such imaging arrays typically comprise 500,000 to 1,000,000 microscopic light sensors arranged on the surface of the imaging chip. Each sensor generates an analog value (e.g., voltage) which is a function of the incident light intensity. For an image to be stored, it is generally necessary to digitize the analog value from each sensor.

Digitization is typically performed with a high speed analog-to-digital converter (ADC) which sequentially digitizes the analog signal from each sensor. The large number of sensors in an imaging array results in a large amount of data being produced by each image acquired. Therefore, for most imaging devices, some kind of data compression scheme is employed to make the digitized image easier to store and transmit.

Separable 2-D transforms are commonly used for data compression because they are relatively easy to implement (because they are 'separable'). JPEG and MPEG are examples of image data compression techniques that use separable 2-D transforms. FIG. 1 shows an 8×8 pixel array and illustrates some of the basic concepts involved in a separable 2-D transform. In a separable 2-D transform, the digital values from each row and each column are multiplied by a precomputed digital coefficient ($R_1$, $R_2$, . . . $R_8$; $C_1$, $C_2$, . . . $C_8$). In this way, each pixel value is multiplied by a number $R_iC_j$, where i and j are integers between 1 and 8. The computation and use of separable 2-D transforms is well known in the art of signal processing. There exist many different kinds of separable 2-D transforms. Many data compression techniques, including separable 2-D transforms, require a large number of arithmetic multiplications to be performed, due to the large number of digitized pixel values. It is noted that the 8×8 pixel array of FIG. 1 is typically only a small block in a larger pixel array having many thousands of pixels.

The current approach to performing these multiplications (for example, in a digital camera) is to output the digital pixel values to a dedicated digital signal processor to perform the digital multiplications. This can be a problem because it requires a relatively expensive processing chip and consumes a lot of power.

An alternative approach suggested in the literature performs multiplication directly on the analog values before digitization, followed by variable step size quantization (digitization). This approach is undesirable because it requires analog memory and sophisticated analog processing which requires large silicon area and power and can be complex to implement. For more information, reference can be made to "A Compressed Digital Output CMOS Image Sensor with Analog 2-D Discrete Cosine Transform Processors and ADC/Quantizer", by S. Kawahito et al. ISSCC Digest of Technical Papers, San Francisco, Calif., February 1997.

U.S. Pat. No. 5,801,657 to Fowler et al. discloses a method and apparatus for performing analog-to-digital conversion (ADC) at the pixel level. In other words, each pixel is provided with a simple ADC. Each ADC receives inquiry signals from a driving circuit outside the sensor array. Only one driving circuit is needed for the entire array. The digital pixel values are outputted serially. The method is called Multi-Channel Bit Serial (MCBS) Analog-to-digital Conversion. A single channel version of MCBS is termed a Bit Serial ADC. An MCBS ADC has many advantages applicable to image acquisition, but it does not provide digital multiplication. If a separable 2-D transform is to be performed on an MCBS-digitized image, an additional digital signal processor is required. This increases the cost and power consumption of an imaging device.

Therefore, it would be desirable to be able to perform multiplication on a series of digitized values without needing a separate digital signal processor.

Also, since MCBS ADCs have many advantages, it would be desirable to perform multiplication using the MCBS hardware and method previously disclosed.

SUMMARY OF MCBS ADC OPERATION

(Prior Art)

FIG. 2 shows a single channel bit serial ADC according to U.S. Pat. No. 5,801,657 to Fowler et al.

A single channel bit serial ADC comprises a comparator 20 and a one-bit latch 22. An output 32 of the comparator is connected to the latch gate input 34. A monotonicaly increasing stairstep RAMP signal 24 enters a comparator inverting input 30 and an analog value (a voltage) 28 to be digitized enters a comparator noninverting input 26. Therefore, when the RAMP 24 exceeds the analog voltage 28, output 32 of the comparator goes low. The comparator output enters a gate 34 of the latch 22. BITX 36 enters data input 38 of latch 22. Therefore, when the RAMP signal exceeds the analog voltage 28, the latch 22 latches the BITX value. The latched BITX value is provided at the serial digital output.

FIG. 3 is a diagram illustrating the interaction between RAMP and BITX signals. RAMP 24 is a staircase waveform with predetermined voltage levels 40 and voltage steps 46. BITX is a squarewave. BITX has transitions 42 that are timed so that there is a delay 44 between the BITX transition 42 and RAMP voltage steps 46. The delay 44 provides the latch with a set-up time before the comparator changes states.

RAMP and BITX are designed together such that desired digital values (0 or 1) are associated with predetermined analog voltage ranges, shown as A-B, B-C, C-D, D-E, and E-F. The voltage ranges are determined by the voltage steps 46 of the RAMP signal.

FIG. 4 shows a quantization table for the RAMP and BITX signals of FIG. 3. The digital output associated with the voltage ranges is changed by changing BITX.

The bit serial ADC technique can be used to digitize analog values to multiple bits of precision. The bits are output serially. The bits can be output in any order desired: the most significant bit (MSB) can come first, or the least significant bit (LSB) can come first, for example. A distinct RAMP waveform is required for each bit of precision. The data is output from the latch output between each RAMP waveform. The voltage levels 40 of RAMP and the pattern of BITX can be changed to output any desired quantization table. For example, gray code can be output by appropriately designing BITX and RAMP.

One of the great advantages of bit serial ADCs is that many separate ADCs can be operated in parallel to form a Multi-Channel Bit Serial (MCBS) ADC. This is shown in FIG. 5. The circuitry that generates RAMP and BITX delivers the same RAMP and BITX to all the ADCs 48. Since the hardware for each ADC is so simple, many ADCs (e.g., thousands) can operate in parallel. This feature makes the MCBS ADC particularly useful in applications where a large number of analog values must be digitized. This situation arises, for example, in the digitization of analog signals from an image sensor. In an image sensor, a single ADC can be provided for each pixel, or small group of pixels.

OBJECTS AND ADVANTAGES OF THE INVENTION

Accordingly, it is a primary object of the present invention to provide a method of performing digital multiplication that:

1) is fully compatible with the Multi-Channel Bit Serial analog-to-digital conversion method and hardware,
2) requires no additional hardware to be added to the existing MCBS circuitry,
3) can be used to multiply each digitized value by 2 independently adjustable coefficients,
4) can be programmed to multiply by an accurately determined coefficient,
5) can be used to perform separable 2-D transforms, convolution, and filtering for image data compression,
6) can be used in any situation where a large number of parallel analog signals are to be digitized and multiplied by a coefficient, and
7) can be used in any situation where both analog-to-digital conversion and digital multiplication are performed;

It is also an object of the present invention to provide a method for performing simultaneous analog-to-digital conversion and multiplication in a single slope analog-to-digital converter.

These and other objects and advantages will be apparent upon reading the following description and accompanying drawings.

SUMMARY OF THE INVENTION

The above objects and advantages are attained by altering the RAMP and BITX signals supplied to a bit serial ADC. Altering the RAMP signal can result in multiplication of the digital output by a coefficient, and altering the BITX signal can result in multiplication of the digital output by a second coefficient.

M-RAMP and M-BITX are generic terms used to denote RAMP and BITX signals that provide multiplication.

There exists a 1-RAMP signal that provides no multiplication. Multiplication by a factor of X using RAMP is accomplished by generating a M-RAMP signal having voltage levels different by a factor of 1/X than voltage levels of the 1-RAMP signal. The M-RAMP signal is then applied to a comparator input of a bit serial ADC.

There exists a 1-BITX signal with frequency $F_0$ that provides no multiplication. In providing multiplication via BITX, a M-BITX signal is produced having an average frequency close to $XF_0$. The M-BITX signal comprises alternating segments of frequency $KF_0/N$ and frequency $KF_0/N+1$, where N is a positive integer, and wherein K is an integer. The M-BITX signal is then applied to a data input of a bit serial ADC. In cases where $K \neq 1$, the RAMP signal must be altered as well.

Preferably, $K=2_D$, where D is a number of binary bits used to represent a fractional part of 1/X. Preferably, N is selected so that $N \leq (K/X) < N+1$.

Also preferably, the average frequency of M-BITX is close to $XF_0$. For example, the average frequency of M-BITX is preferably equal to $XF_0$ to within a factor of $1/2^n$, where n is a number of bits of resolution desired for analog-to-digital conversion. Alternatively, the average frequency of M-BITX can be within 10% or 5% of $XF_0$.

The present invention also includes a method for generating M-RAMP having a 'snap to grid' characteristic. The method begins with selecting N, A, and B according to the relation:

$$N + \frac{A}{B} \approx \frac{K}{X}.$$

N and K are integers. K is a grid density factor. Value A is added to a first running sum at a frequency of $2KF_0$. The first running sum can be generated in an accumulator. Value A digital number is produced having value N if the running sum does not roll over a value B after A is added. The digital number has value N+1 if the running sum rolls over the value B after A is added. The series of digital numbers produced are added to a second running sum at a rate of $2KF_0$. The second running sum is sent to a digital to analog converter (DAC). The output of the DAC is the desired M-RAMP signal. Preferably, N is selected such that $N \leq (K/X) < N+1$ (i.e., N is preferably the integer part of K/X). Also preferably, $$N + \frac{A}{B}$$

is very close to the value K/X. The present invention includes algorithms for selecting N, A, and B.

The present invention also includes a similar method for generating M-BITX having a snap to grid characteristic. The method begins with selecting N, A, and B according to the relation:

$$N + \frac{A}{B} \approx \frac{K}{X}.$$

N and K are integers. K is the grid density factor. Value A is added to a running sum. The running sum can be generated in an accumulator, for example. Next a squarewave signal is generated having frequency $KF_0/N$ if the running sum does not roll over the value B after A is added. The squarewave signal has frequency $KF_0/(N+1)$ if the running sum does roll over the value B after A is added. Value A is added to the running sum after every edge transition in the squarewave signal. The squarewave signal is the desired M-BITX signal that provides multiplication by a factor of X. Preferably, N is selected such that $N \leq (K/X) < N+1$ (i.e., N is preferably the integer part of K/X). Also preferably, $$N + \frac{A}{B}$$

is very close to the value K/X. The present invention includes algorithms for selecting N, A, and B.

The present invention also includes an apparatus for generating M-RAMP. The apparatus has a first accumulator for generating a first running sum. The first accumulator has a capacity B. The value A is added to the first running sum at a frequency of $2KF_0$. Values N, A and B are selected according to the relation:

$$N + \frac{A}{B} \approx \frac{K}{X},$$

where N is an integer and K is the grid density factor. The apparatus also has a number selector. The number selector provides a digital number N when the running sum does not roll over the capacity B after A is added. The number selector provides a digital number N+1 when the running sum does roll over the capacity B after A is added. The number selector provides digital numbers at a frequency of $2KF_0$. The apparatus also has a second accumulator for adding the digital numbers to a second running sum. The apparatus further has a digital to analog converter (DAC) for converting the second running sum to an analog value. The analog values provided by the DAC comprise the desired M-RAMP signal that provides multiplication by a factor of X. The apparatus may include a clock for assuring that the accumulators and DAC operate at the correct frequencies.

The present invention also includes an apparatus for generating M-BITX with a snap to grid characteristic. The apparatus has an accumulator for adding the value A to a running sum within the accumulator. The accumulator has a capacity B. Values N, A and B are selected according to the relation $$N + \frac{A}{B} \approx \frac{K}{X}$$

where N is an integer, and K is the grid density factor. The apparatus also has a squarewave frequency generator in communication with the accumulator. The frequency generator generates frequency $KF_0/N$ when the running sum does not roll over the capacity B after A is added to the running sum. The frequency generator generates frequency $KF_0/(N+1)$ when the running sum does roll over the capacity B after A is added to the running sum. The accumulator adds A to the running sum after every transition edge of the squarewave frequency generator output. The frequency generator output is the desired M-BITX signal that provides multiplication by a factor of X. Preferably, the squarewave frequency generator comprises a clock providing frequency $KF_0$ in communication with a frequency divider having a modulus selectable to be either N or N+1.

The present invention also includes an apparatus for acquiring an image and compressing/filtering the image. The apparatus has an array of photodetectors for producing analog signals. The photodetectors are arranged in rows and columns. The apparatus has bit serial analog-to-digital converters (ADCs) in communication with the photodetectors. The apparatus has M-RAMP generators for generating a number of different M-RAMP signals that provide multiplication by different coefficients. The apparatus has M-BITX generators for generating a number of different M-BITX signals that provide multiplication by different coefficients. The apparatus has circuitry for providing the different M-RAMP signals to the different columns, and for providing the different M-BITX signals to the different rows. The circuitry can, for example, comprise a switch matrix. The M-RAMP and M-BITX generators can comprise look-up tables storing information on the design of the different M-RAMP and M-BITX signals. Also, the M-RAMP and M-BITX generators can comprise fractional-N phase locked loops. It is understood that rows and columns in the present invention are interchangeable. Therefore, an apparatus with M-RAMP signals provided to the different rows, and M-BITX signals provided to the different columns is well within the scope of the claimed invention. It is also understood that rows and columns may be in a hexagonal array, or a radial array or pixels.

The present invention also includes a method for performing simultaneous A/D conversion and multiplication by a factor of X in a single slope ADC. The method has the step of changing the voltage/time slope of a single slope RAMP (SS-RAMP) signal used in the single slope ADC by a factor of 1/X.

The present invention also includes a second method for performing simultaneous A/D conversion and multiplication by a factor of X in a single slope ADC. The method has the step of changing the frequency of a single slope FREQ (SS-FREQ) signal used in the single slope ADC by a factor of X.

The present invention also includes a method for performing simultaneous analog-to-digital conversion and compression/filtering in an imaging photodetector array in communication with bit serial ADCs. Different M-BITX signals are provided to the different rows so that digital values from photodetectors in a given row are multiplied by the same coefficient. Different M-RAMP signals are provided to the different columns so that digital values from photodetectors in a given column are multiplied by the same coefficient. Therefore, each digital value from each photodetector in the array is multiplied by two coefficients determined by the location of the photodetector in the array. The method can be applied to small blocks in the array. The bit serial ADCs may be located on the photodetector array, or may be located on a separate chip.

The present invention also includes a method for performing simultaneous analog-to-digital conversion and compression/filtering in an imaging photodetector array in communication with single slope ADCs. Different multiplying SS-FREQ signals (M-SS-FREQ) are provided to the different rows so that digital values from photodetectors in a given row are multiplied by the same coefficient. Different multiplying SS-RAMP signals (M-SS-RAMP) are provided to the different columns so that digital values from photodetectors in a given column are multiplied by the same coefficient. Therefore, each digital value from each photodetector in the array is multiplied by two coefficients determined by the location of the photodetector in the array. The method can be applied to small blocks in the array. The single slope ADCs may be located on the photodetector array, or may be located on separate chip.

DETAIL DESCRIPTION

The present invention discloses methods of performing multiplication simultaneously with A/D conversion. In all the embodiments described, the multiplication coefficients are preferably less than 1. This is because the analog signals to be digitized are assumed to occupy the entire dynamic range of the ADC. If the analog signal does not occupy the entire dynamic range, then multiplication by a coefficient greater than 1 is possible.

Coefficients greater than 1 are not needed in most data compression applications because a set of coefficients can be normalized to be less than 1.

The present invention provides a method for each bit serial ADC to multiply its digital output by two independent coefficients. One coefficient is determined by appropriately altering the RAMP 24 waveform, and the other coefficient is determined by appropriately altering the BITX 36 waveform. Multiplication via the RAMP 24 waveform is conceptually simpler, so it is explained first.

Multiplication Via Ramp

Figure 1:
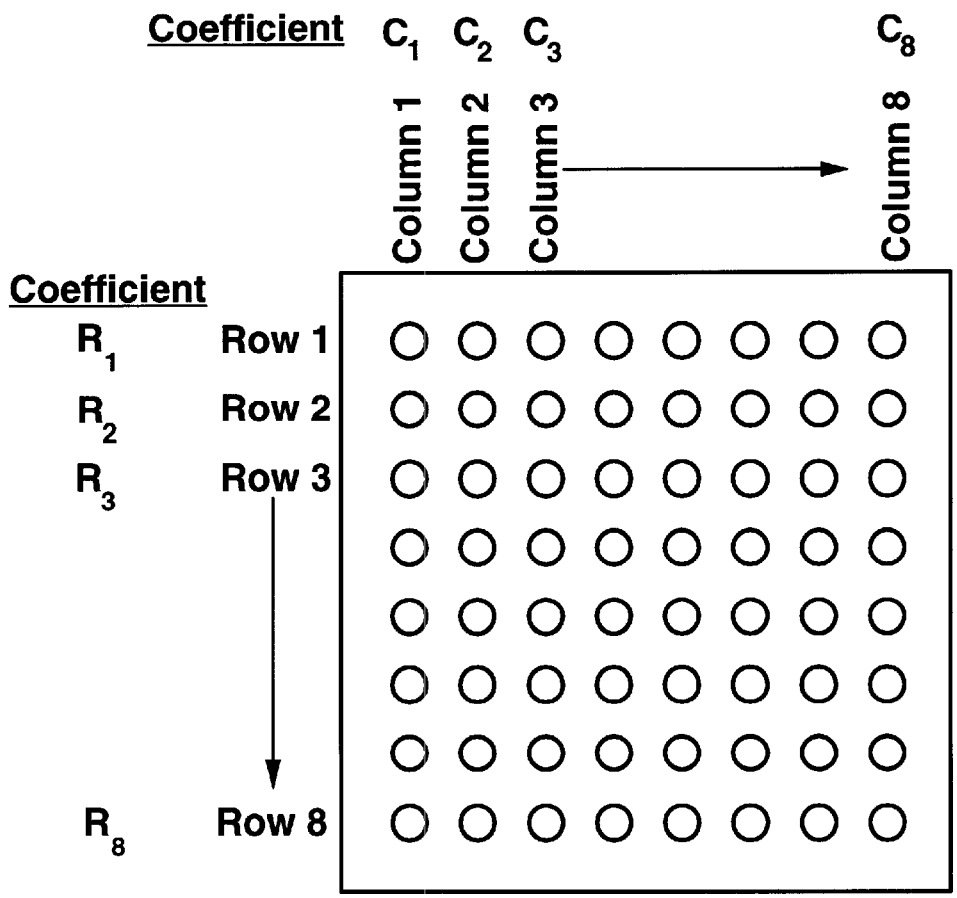
FIG. 1 (Prior Art) shows an 8×8 pixel image sensor.
Figure 2:
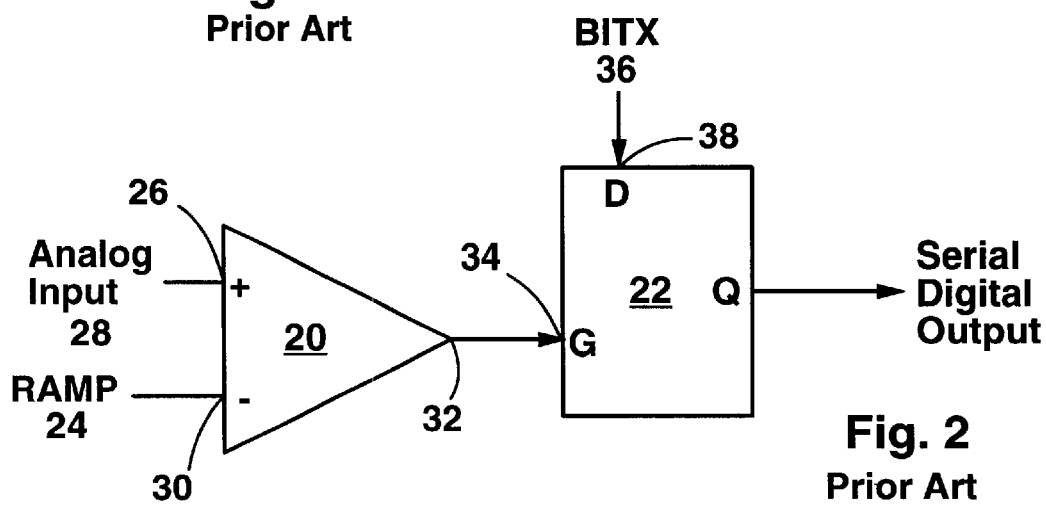
FIG. 2 (Prior Art) shows hardware used for an MCBS ADC.
Figures 3, 4:
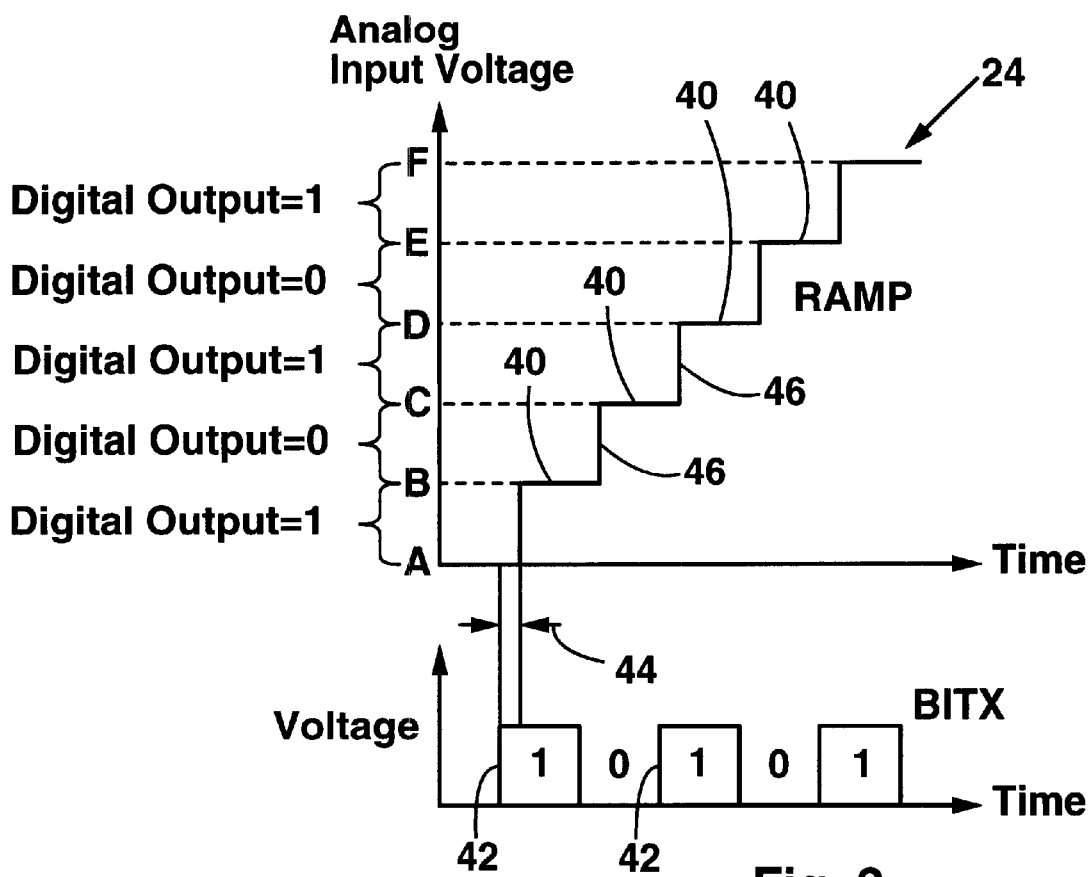
FIG. 3 (Prior Art) illustrates how an MCBS works.
FIG. 4 (Prior Art) is a quantization table for a MCBS that operates with the waveforms of FIG. 3.
Figure 5:
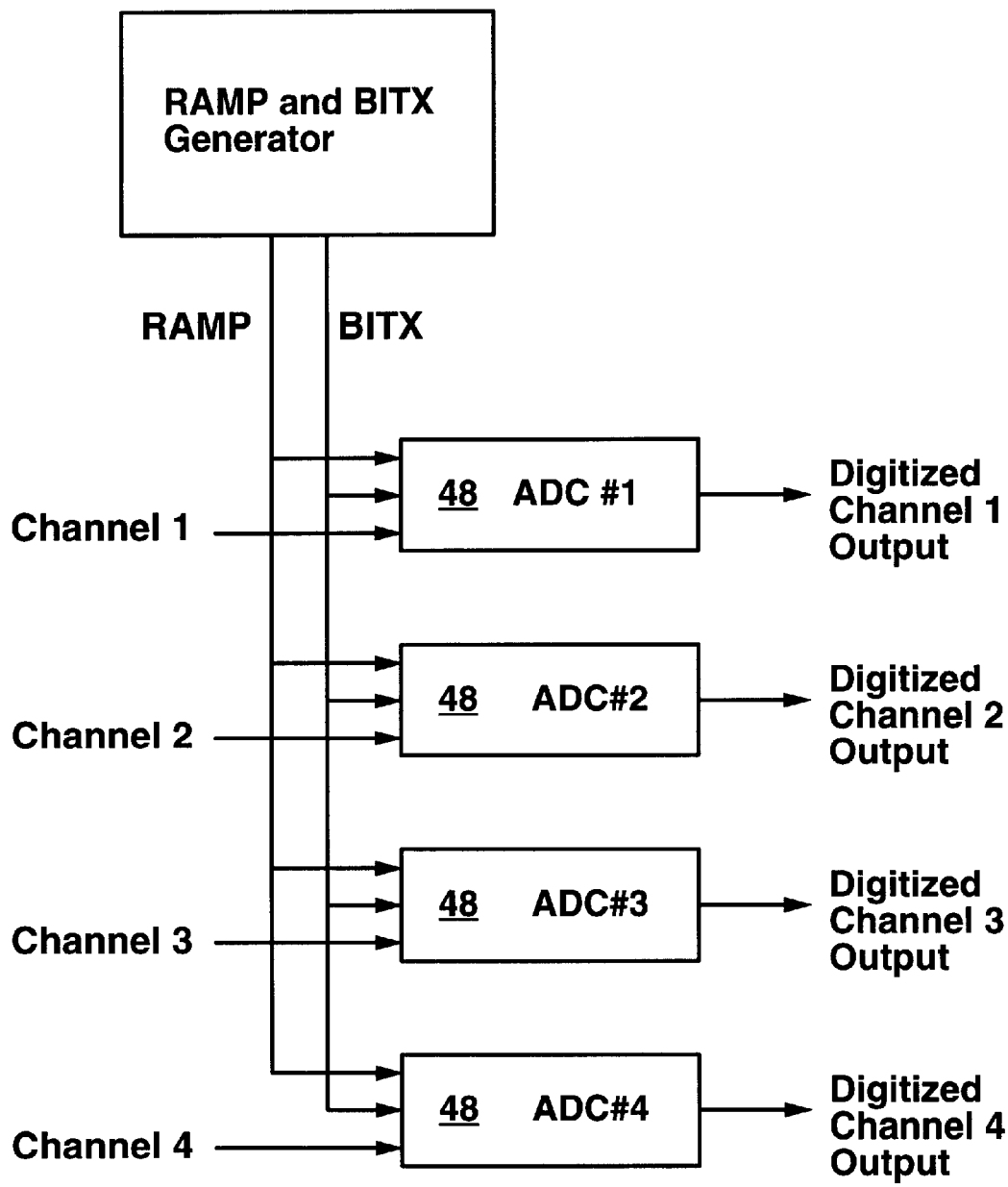
FIG. 5 (Prior Art) shows a multiple channel MCBS ADC.
Figure 6:
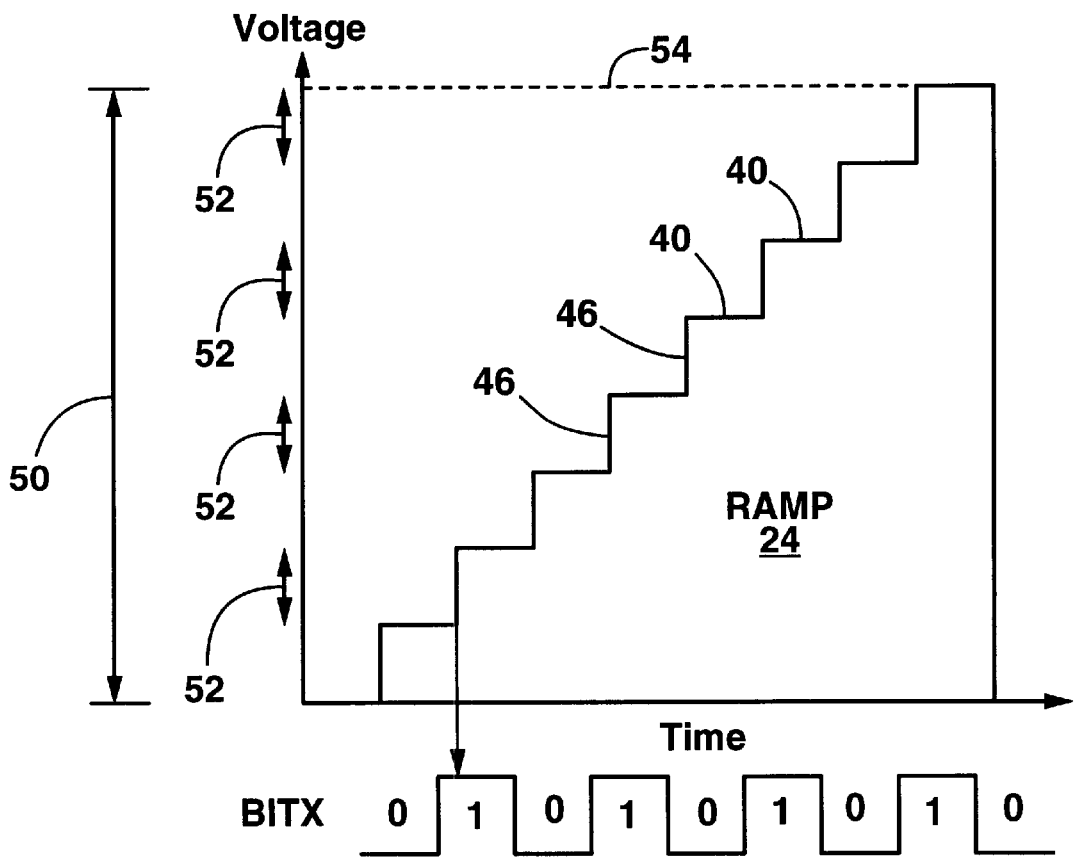
FIG. 6 shows RAMP and BITX signals providing multiplication by a factor of 1 (i.e., no multiplication).

FIG. 6 shows a 1-RAMP signal 24 that provides no multiplication (i.e., multiplication by a factor of 1). The input range 50 of the analog input is also shown, and dictates a maximum analog voltage level 54. The 1-RAMP signal 24 has the same input range 50 as the analog input. The voltage ranges 52 shown indicate analog input voltages for which the digital output will be a 1 (output high). The voltage ranges 52 correspond with voltage steps 46 that occur when BITX is 1. The 1-RAMP signal 24 is defined as being the RAMP signal that provides analog-to-digital conversion without multiplication.

Figure 7:
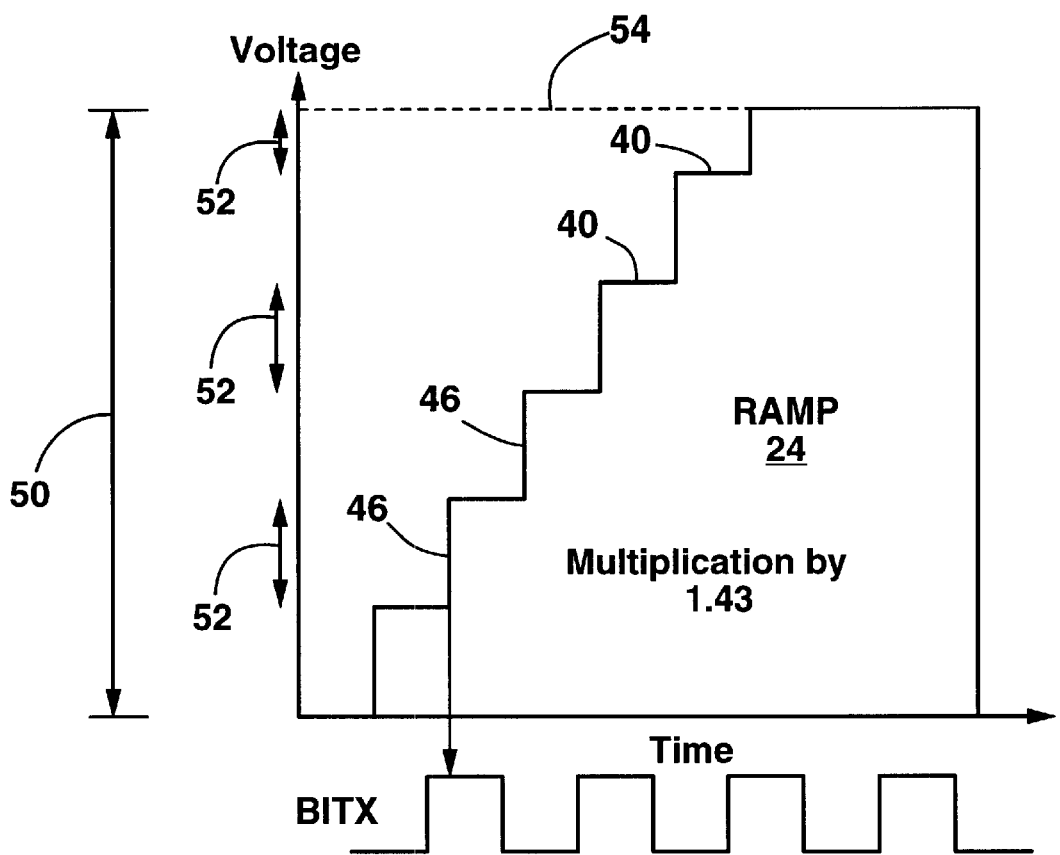
FIG. 7 shows an example of a M-RAMP signal which provides multiplication.

Multiplication via RAMP is accomplished by multiplying the voltage levels 40 of 1-RAMP by the inverse of the desired multiplication coefficient. BITX is unaffected. A RAMP signal providing multiplication is termed a M-RAMP signal. For multiplication by X, the voltage levels 40 are multiplied by 1/X. For example, to multiply the digital output of the bit serial ADC by a coefficient of 0.7, the 1-RAMP voltage levels 40 are multiplied by 1.43 (i.e., 1/0.7). FIG. 7 shows the 1-RAMP signal 24 multiplied by 1.43 to produce a 0.7M-RAMP signal for multiplication by 0.7. The 0.7M-RAMP signal is truncated at the maximum analog voltage 54. The change from 1-RAMP to 0.7M-RAMP increases in voltage the ranges 52 for which the analog input results in a digital output of 1. Therefore, the analog input must have a proportionately higher voltage in order to generate the same digital output. Therefore, digital multiplication (by a coefficient less than 1) is accomplished by increasing the voltages of the voltage levels 40.

Multiplication by a coefficient greater than 1 can be achieved by reducing the voltages of the voltage levels 40 if, without multiplication, the range 50 of 1-RAMP is greater than the dynamic range of the analog input.

Multiplication for multiple bits is achieved by simply multiplying the voltage levels 40 of all the 1-RAMP waveforms (for the MSB through LSB) by the same coefficient.

Multiplication Vai BITX

The BITX waveform can provide multiplication, or can provide no multiplication. In the following discussion, a BITX waveform which provides no multiplication is referred to as 1-BITX; a BITX waveform that provides multiplication is referred to as M-BITX. 1-BITX is a square-wave with a frequency of $F_0$.

For multiplication by BITX, in certain cases (i.e., cases where a reference clock runs faster than reference frequency $F_0$ and a grid density factor K is greater than 1) it is necessary to also change RAMP. However, when the clock is faster than $F_0$, the changes in RAMP are independent of the changes in voltage levels used to produce multiplication by RAMP. Therefore, the present invention provides a method for multiplying the output of a bit serial ADC by two independent coefficients; one coefficient is set by the design of RAMP, the other coefficient is set by the design of BITX. These issues are discussed in more detail below.

Figure 8:
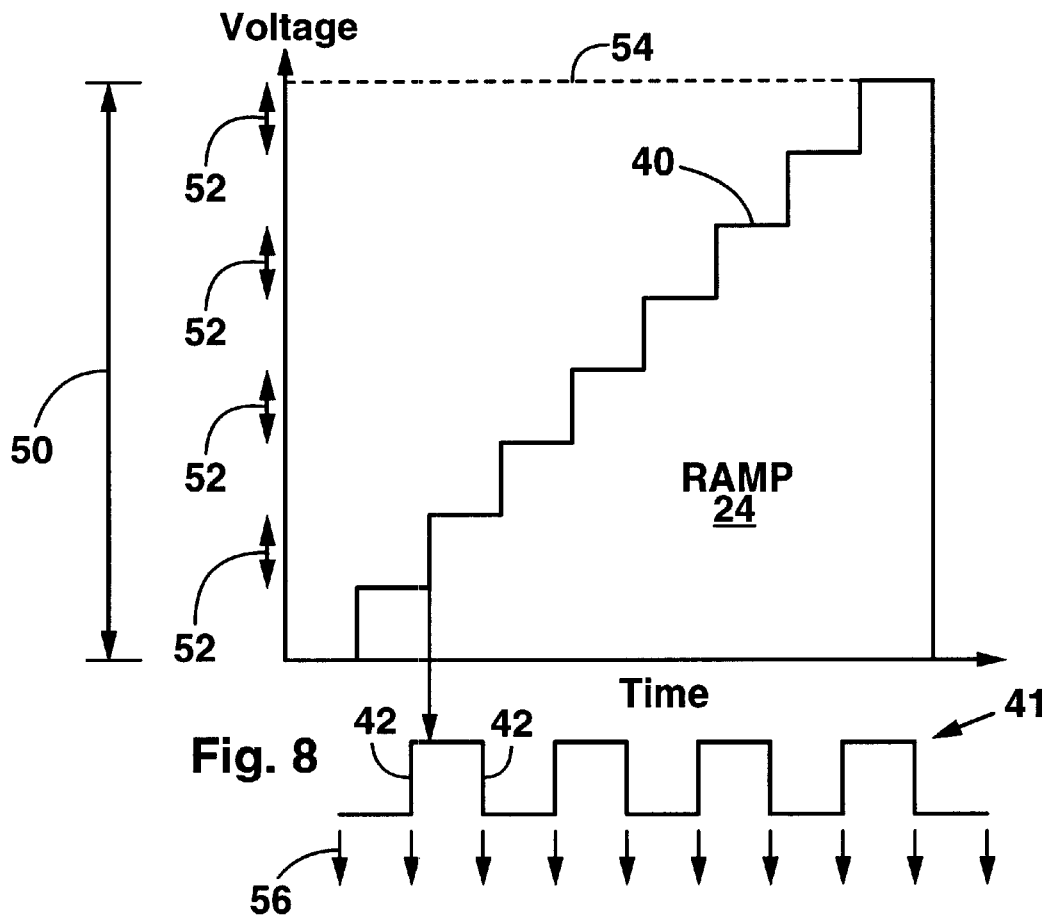
FIG. 8 shows an example of a BITX signal that provides no multiplication.

FIG. 8 shows typical RAMP and 1-BITX 41 waveforms which provide no multiplication. The 1-BITX signal 41 has regularly spaced edge transitions 42. RAMP establishes a series of time locations 56, with one time location for each RAMP voltage step. 1-BITX has the frequency $F_0$. The series of time locations has frequency $2F_0$.

Multiplication by a factor of X using BITX is achieved by producing an M-BITX (multiplying BITX signal) which has an average frequency of $XF_0$ (average when measured over a long time period). Typically, X is normalized to be less than 1, so M-BITX has a slower frequency than 1-BITX. However, M-BITX cannot be a signal at constant frequency $XF_0$ unless 1/X is an integer. This is because any useful M-BITX signal must have edge transitions that are simultaneous with the time locations 56. A squarewave with frequency $XF_0$ will have edge transitions simultaneous with time locations 56 only if 1/X is an integer.

Figure 9:
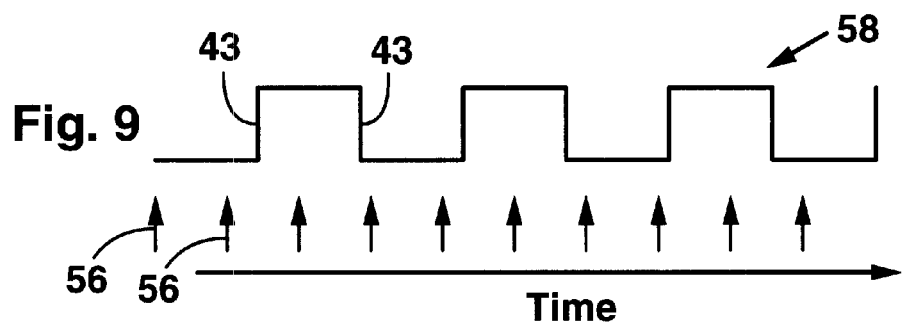
FIGS. 9 and 10 illustrate the 'snap to grid' characteristic of M-BITX.

Consider a squarewave of frequency $0.7F_0$ 58, shown in FIG. 9. Since 1/0.7=1.43 and 1.43 is not an integer, transition edges 43 are not synchronized with any of the time locations 56.

Figure 10:
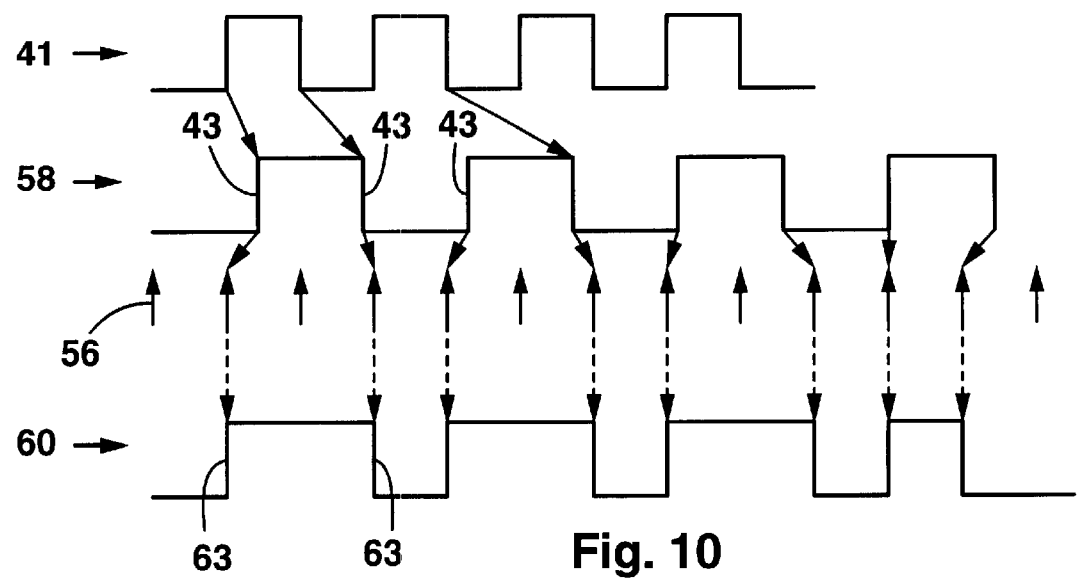

However, multiplication by a factor close to 0.7 using a M-BITX signal is still possible. FIG. 10 illustrates the design of a 0.7M-BITX signal 60 that provides multiplication by 0.7. The original 1-BITX signal 41 at frequency $F_0$ is shown. RAMP 24 establishes time locations 56. The squarewave of constant frequency $0.7F_0$ 58 cannot be used as an M-BITX signal because it does not have transition edges 43 synchronized with time locations 56. A useful 0.7M-BITX signal 60 providing multiplication by a factor of 0.7 is designed by locating the transition edges of squarewave 58 to the nearest time location 56 according to a 'snap to grid' technique. The resultant 0.7M-BITX signal 60 consists of alternating segments of frequency $F_0$ and frequency $0.5F_0$. More specifically, the resultant 0.7M-BITX signal has frequency $F_0$ 40% of the time, and frequency $0.5F_0$ 60% of the time (since 0.5(0.6)+1.0(0.4)=0.7). The average frequency of 0.7M-BITX produced by the 'snap to grid' technique is $0.7F_0$. When measured over a long time interval, the average frequency of M-BITX 60 is $0.7F_0$.

Figure 11:
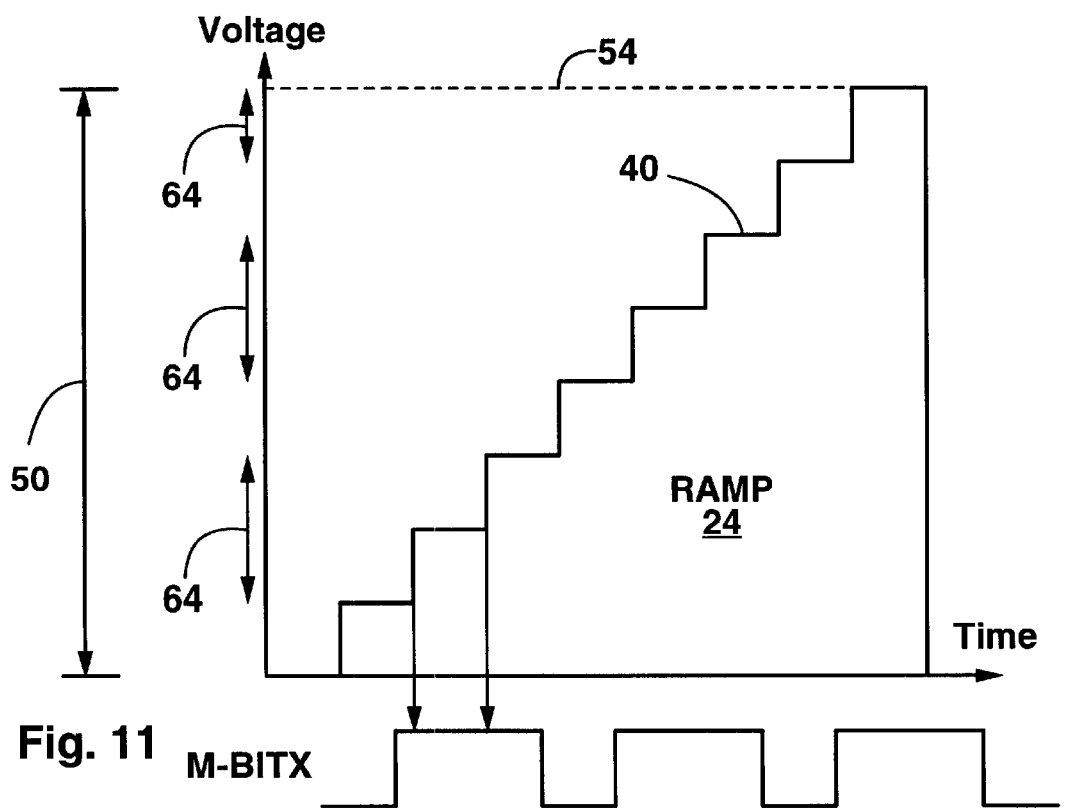
FIG. 11 shows the results of using the M-BITX signal constructed according to FIG. 10.

FIG. 11 shows 0.7M-BITX 60 in concert with the original RAMP signal of FIG. 8. Ranges 64 indicate voltages for which the ADC will output a 1. Ranges 64 have increased in voltage and become 'wider' (due to slow average frequency of 0.7M-BITX) compared to ranges 52 in FIG. 7. Therefore, an input analog voltage must be higher to produce the same digital output. Multiplication by a number less than 1 is therefore provided by using 0.7M-BITX 60. It is noted that, in this specific case, the ranges 64 are not exactly what they should be for accurate multiplication by 0.7. However, FIG. 11 only serves to illustrate that multiplication is possible by changing the frequency of M-BITX. Preferred embodiments of the present method discussed below teach how to increase accuracy of multiplication using M-BITX.

Multiplication is more accurate if more voltage steps 46 are present in the RAMP signal.

The above description for 'snap to grid' (grid defined by time locations 56) is a conceptual aid in understanding how M-BITX depends upon the multiplying coefficient. The above description does not necessarily describe how M-BITX is actually generated. The M-BITX signal is not necessarily generated using a discrete device which performs the 'snap to grid' operation on the squarewave signal 58. However, any useful M-BITX signal must have a 'snap to grid' characteristic. It is noted that any method of producing an M-BITX signal with a 'snap to grid' characteristic is within the scope of the present invention.

The preferred embodiment discussed below describes how M-BITX can be generated for any multiplying coefficient X.

Figure 12:
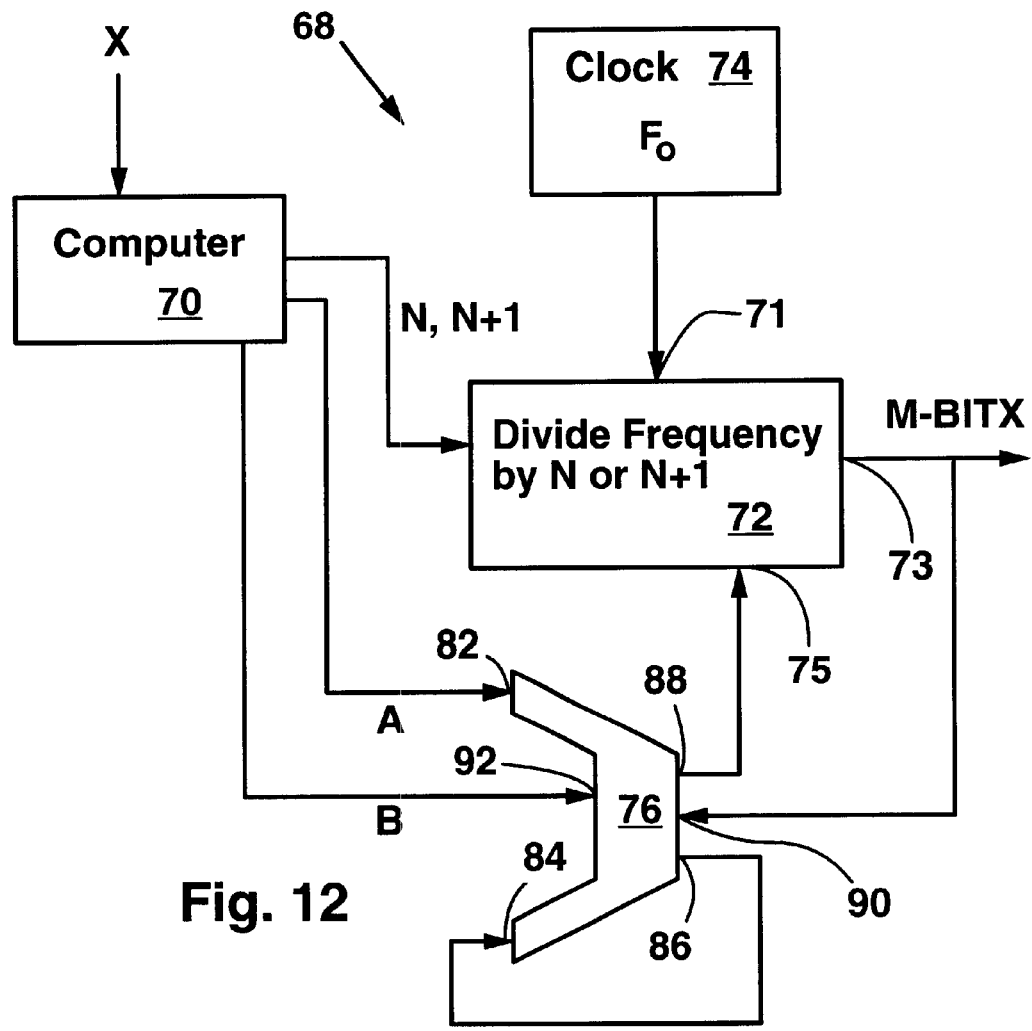
FIG. 12 shows a circuit which can be used to generate a M-BITX signal having a 'snap to grid' characteristic and an average frequency of $F_0X$.

FIG. 12 shows a circuit 68 that can generate an M-BITX signal with a 'snap to grid' characteristic and an average frequency of $F_0 X$ for a coefficient X (X=0.7 in the above example), and a reference frequency $F_0$. The method for producing M-BITX is similar to fractional-N phase locked-loop synthesis techniques. For more information concerning fractional-N PLL synthesis, reference can be made to "The Evolution and Maturity of Fractional-N PLL Synthesis", by B. G. Goldberg, *Microwave Journal*, September 1996.

The circuit 68 includes a computer 70, a frequency divider 72, a clock 74, and an accumulator 76 (digital adder). The clock 78 is set to generate a squarewave signal at fixed reference frequency $F_0$. The frequency divider has an input 71, an output 73, and a modulus control 75. The accumulator 76 has a first input 82, a second input 84, an output 86, a carry out 88, an edge-sensitive trigger 90, and a capacity set input 92. The clock signal at $F_0$ is connected to the input 71. The carry out 88 is connected to the modulus control 75. The output 86 of the accumulator is connected to the second input 84.

Given a multiplying coefficient X, the computer 70 determines quantities N, A, and B based on the relation:

$$N + \frac{A}{B} \approx \frac{K}{X}.$$

Values of N+(A/B) close to the value of 1/X provide accurate A/D conversion and multiplication. N is an integer.

As a general guideline, N is usually equal to the integer part of 1/X (e.g., N=3 for 1/X=3.43). Also, A and B are usually chosen such that A/B is approximately equal to the fractional part of (1/X). For example, if 1/X=3.43, then A and B are usually chosen so that A/B≈0.43.

Discussed below on following pages are three useful algorithms (algorithms 1–3) for selecting N, A, and B given coefficient X.

After N, A, and B are determined, the circuit 68 is configured with the following settings:

1) The value A is continuously provided at the first input 82.
2) The capacity of the accumulator is set to B.
3) The frequency divider modulus is set to be either N or N+1, depending upon a signal at the modulus control 75.

The modulus of the divider is N+1 when the carry out 88 is high (i.e., when a running sum within the accumulator rolls over the capacity B).

4) The internal state of the accumulator is initialized to a value between 0 and B−1. Preferably, the internal state of the accumulator is initialized to B/2.

These settings can be done manually, or by the computer 70, or the circuit can be permanently set with constant values of N, A and B if X is constant for the life of the circuit 68.

In operation, frequency $F_0$ enters the frequency divider. The frequency divider outputs frequency $F_0/N$ from output 73. The accumulator adds the digital numbers at first 82 and second 84 inputs every time a transition (high to low or low to high) occurs at the output 73. Since the accumulator output 86 is connected to second input 84, a running sum is generated within the accumulator 76. If the accumulator is initialized with a value of 0, then the running sum has successive values 0, A, 2A, 3A, 4A, and so on up to the capacity B (i.e., A is added to the running sum with every transition of the frequency divider output 73). If the accumulator is initialized with a value of 1/2B, then the running sum has successive values 1/2B, 1/2B+A, 1/2B+2A, 1/2B+3A, and so on up to the capacity B. When the running sum reaches capacity B, the carry out 88 goes high and the frequency divider modulus changes to N+1. While the carry out 88 is high, the frequency divider outputs frequency $F_0/N+1$. Therefore, the frequency divider output provides alternating segments of frequency $F_0/N$ and frequency $F_0/N+1$.

Optionally, the first accumulator is reset to a predetermined value between 0 and B−1 after every RAMP signal is generated (i.e., for each output bit provided by the MCBS ADC).

The accumulator has a capacity of B, which means that when the running sum exceeds B, the value of the running sum is set to the amount by which B was exceeded. The capacity B is 'rolled over'. For example, for B=100 and A=27, if the running sum has a value of 90, the next running sum value is 17. The carry out then goes high, and the following value of the running sum is 27+17=44. The carry out returns low since 17 to 44 does not include a rollover operation.

The output of the frequency divider is the desired M-BITX signal that provides multiplication by a factor of X. The average frequency (averaged over a long time interval) of the frequency divider output is $F_0X$. All the transitions of the M-BITX signal created by the circuit are synchronized with the transitions of the original $F_0$ signal generated by the clock 74. Therefore, the M-BITX signal generated by the circuit has a 'snap to grid' characteristic.

Figure 13:
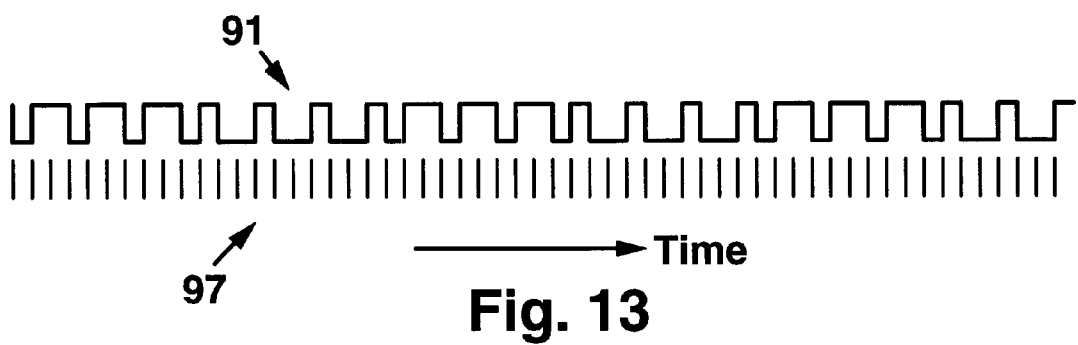
FIG. 13 shows an example of a M-BITX signal which consists of alternating segments of different frequencies.

FIG. 13 shows an M-BITX signal 91 generated according to the present invention for X=0.7. The accumulator was initialized at zero. Lines 97 indicate the 'snap to grid' time locations of frequency $2F_0$. The two frequencies used are $F_0$ and $1/2 F_0$ (since 1<1.43<2). The frequency usually changes with every transition, so the different frequencies appear as different durations in the 'high' and 'low' states.

Algorithms 1–3 for Selecting N, A, and B

In all the following algorithms, n is defined as the number of bits of precision desired for the A/D conversion (e.g., n=3 if 3 bits of precision are desired in the A/D conversion).

Algorithm 1

In this simple algorithm,

N=integer part of 1/X, i.e., $N \leq 1/X < N+1$ $B=2^n$, and

A=Round(B(frac(1/X))).

Where 'Round' denotes the operation 'round to the nearest integer', and 'frac', denotes the operation 'take the fractional part of'.

Algorithm 2

This algorithm is typically the most efficient. The idea is to express X as a fraction B/C as accurately as possible, with the constraint that C is less than a chosen constant. For example, the constraint $C<2^n$ can be used. Then, N, A, and B are obtained from the expression:

$$\frac{B}{C} = N + \frac{A}{B}.$$

With the constraint that N is an integer. The fraction B/C is found using the Stern-Brocot tree as a number system. For more information on using a Stern-Brocot number tree to find the fraction B/C, reference can be made to Concrete Mathematics, p118–122 by Graham., Knuth, and Patashnik.

Algorithm 3

In this algorithm,

B=Round($2^n$X), where 'Round' denotes the operation 'round to the nearest integer', N=integer part of $2^n$/B, and A=$2^n$mod(B), where 'mod' indicates the modulus operation.

In algorithm 3, N is not necessarily equal to the integer part of 1/X.

The present invention is not limited to algorithms 1–3. Many techniques can be used to find N, A, and B such that N+(A/B)≈1/X.

As mentioned above, for accurate A/D conversion, N+(A/B) should be close to 1/X. How close depends upon the desired bit resolution of the A/D conversion-i.e., it depends on n. For best results, N+(A/B) should be within a factor of (1/2n) of 1/X. For example, for n=1 (1 bit resolution A/D conversion), N+(A/B) should be within 50% of 1/X. For n=3, N+(A/B) should be within 12.5% of 1/X. However, this is a general guideline, not an absolute requirement.

The M-BITX signal produced by the circuit 68 results in relatively inaccurate multiplication of the digital output. The reason for this inaccuracy is that the 'grid' of time locations 56 is relatively coarse and there are only a relatively small number of voltage steps 46. Each voltage step must be associated with an output value of 1 or 0. If there are relatively few voltage steps 46 in the RAMP signal, then the output cannot have high accuracy. Therefore, adding more voltage steps 46 to the RAMP signal can provide an output with higher multiplication accuracy. However, the accuracy of the output is only improved if, in addition to more voltage steps, the grid established by time locations 56 has more time locations (i.e., if there are more time locations 56 per unit time).

Figure 14:
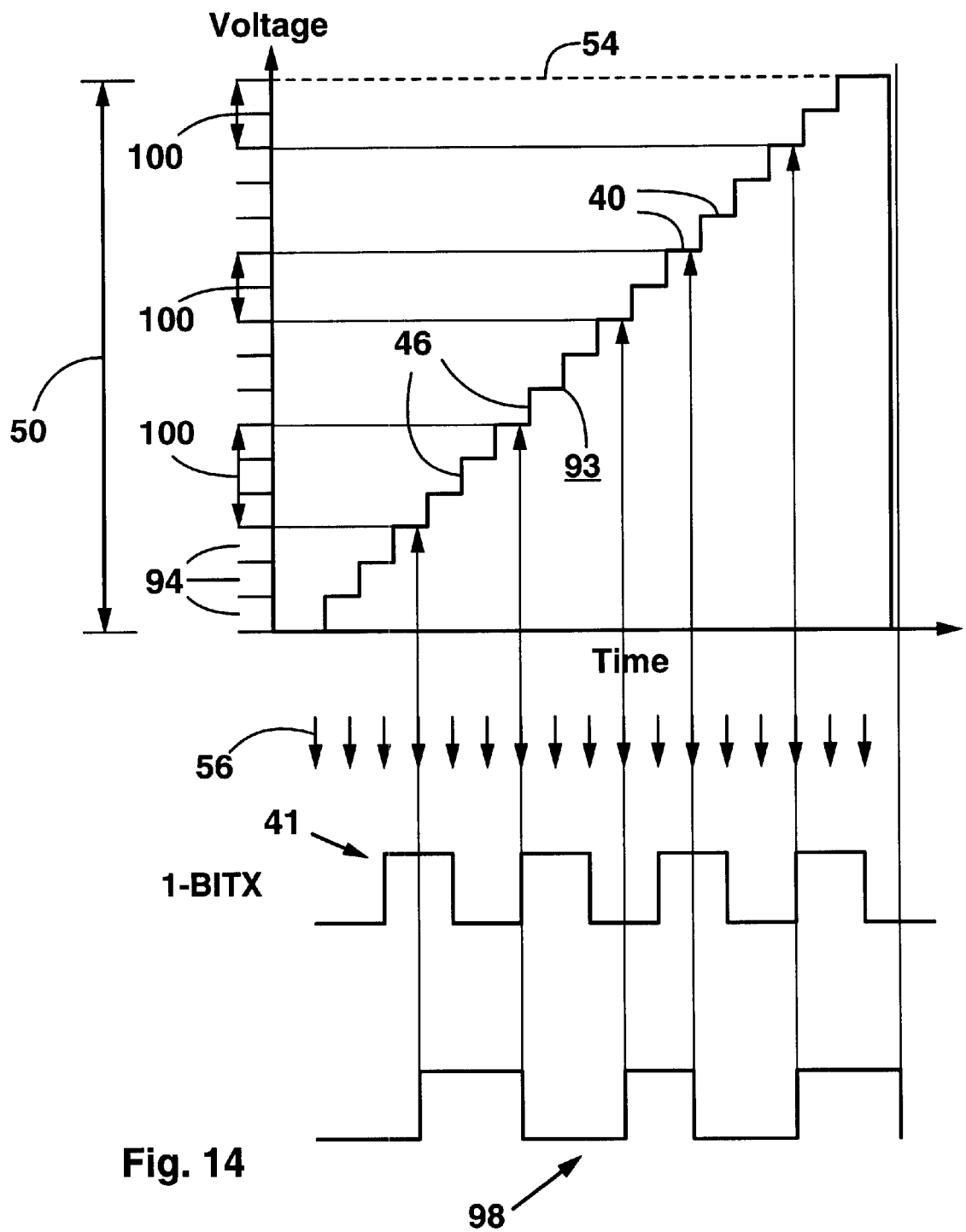
FIGS. 14 shows RAMP and M-BITX signals generated in a case where a grid density factor equals 2.

FIG. 14 shows RAMP signal 93 and 1-BITX signal 41 where the RAMP 93 has twice as many voltage steps 46 and levels 40 as the RAMP signal of FIGS. 8 and 11. Time locations 96 are twice as dense as time locations 56 since RAMP 93 has twice as many voltage steps 46. The fine structure of RAMP partitions the input range 50 into twice as many voltage ranges 94 compared to RAMP of FIGS. 6 and 8. The increased density of time locations 96, and higher number of voltage ranges 94 allows higher accuracy multiplication. It is noted that, although the number of voltage steps 46 and time locations 96 is doubled, the frequency for 1-BITX 41 is still $F_0$ (the same frequency used in FIGS. 6 and 8).

In the improved accuracy approach of FIG. 14, the generation of M-BITX can be considered to follow the same 'snap to grid' approach of FIG. 10, except that the time locations 96 are twice as numerous as time locations 56.

Figure 15:
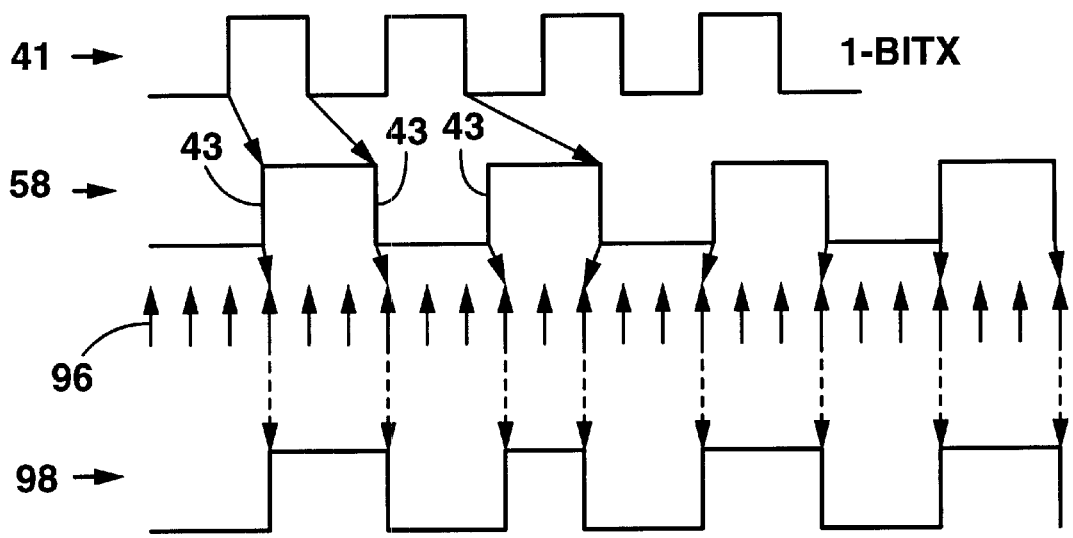
FIG. 15 illustrates how the 'snap to grid' characteristic applies in cases where a grid density factor K is greater than one.

FIG. 15 illustrates an example for X=0.7. Here, the squarewave signal 58 having frequency $F_0 0.7$ is shown. Snapping the transitions 43 to the nearest time location 96 produces a proper M-BITX signal 98. Since the time locations 96 are more closely spaced (compared to locations 56), the resulting M-BITX signal 98 more closely resembles the squarewave 58 (compared to M-BITX signal 60).

M-BITX signal 98 is aligned with RAMP signal 93. Use of the M-BITX signal 98 with the RAMP 93 results in voltage ranges 100 being assigned digital values of 1. The voltage ranges 100 more accurately represent multiplication by 0.7 than the voltage ranges 64 of FIG. 11.

In the present application, the density of the time locations 56, 96 (which are determined by voltage steps in RAMP) compared to the density of transitions in the 1-BITX reference frequency ($F_0$) is referred to as the grid density factor K. In the above example, the grid density factor K is 2 (i.e., K=2). In all the previous examples, the grid density factor K is 1 (i.e., K=1).

It is noted that a grid density factor of 2 does not provide a large increase in accuracy compared to a grid density factor of 1. The example of FIG. 14 is only intended to provide an example of how increasing the grid density factor improves the accuracy of the methods of the present invention. Most generally, the higher the grid density factor, the more accurate the multiplication.

Figure 16:
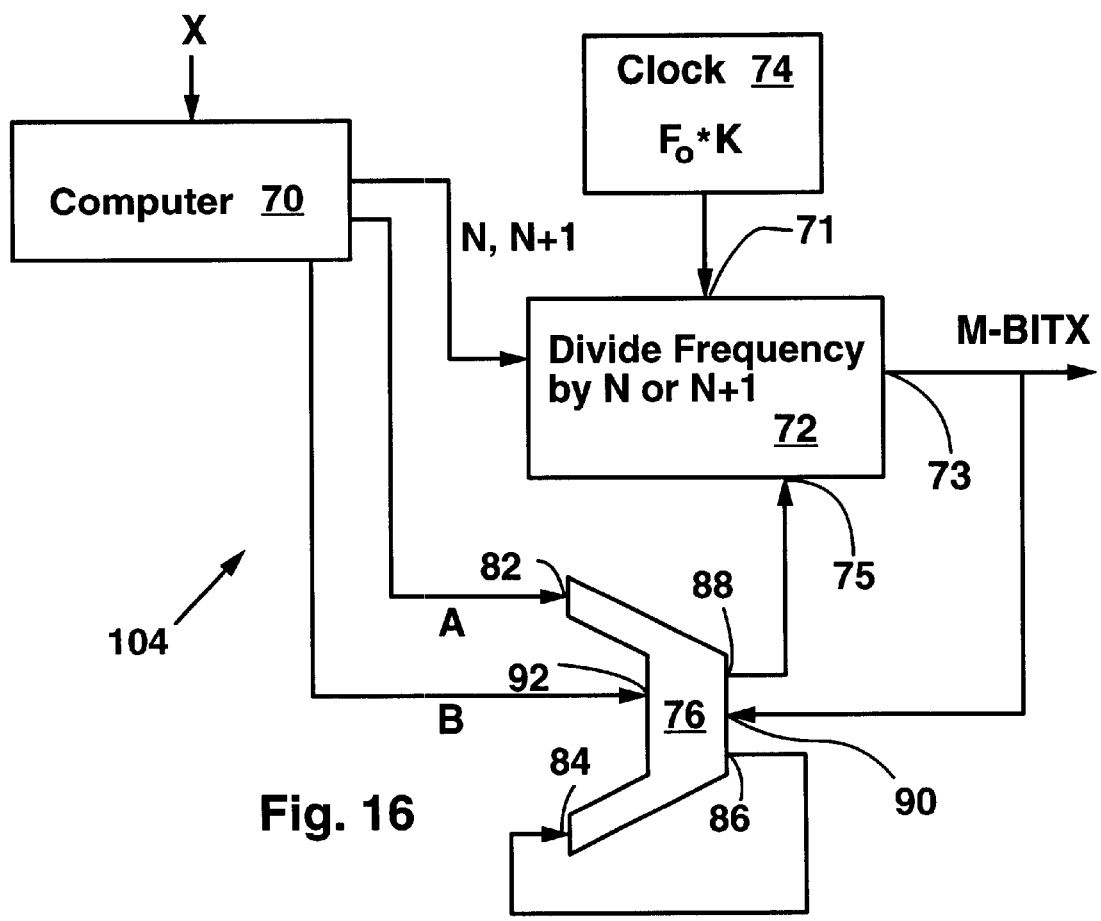
FIG. 16 shows a circuit for generating an M-BITX signal given a multiplying coefficient X and the grid density factor K.

FIG. 16 shows a circuit 104 that can generate M-BITX signals according to any grid density factor K and coefficient X. All the circuit components are the same as in FIG. 12 except that the clock 74 runs at a frequency of $KF_0$.

Given a multiplying coefficient X, and a grid density factor K, the computer 70 determines quantities N, A, and B generally based on the relation:

$$N + \frac{A}{B} \approx \frac{K}{X}.$$

Values of N+(A/B) close to the value of K/X provide accurate A/D conversion and multiplication. N and K are integers.

As a general guideline, N is usually equal to the integer part of K/X (i.e., N=3 for K/X=3.43). Also, A and B are usually chosen such that A/B is approximately equal to the fractional part of (K/X). For example, if K/X=3.43, then A and B are usually chosen so that A/B≈0.43. However, many other options for N, A, and B exist and are within the scope of the present invention.

Discussed below are three useful algorithms (algorithms 4–6) for determining N, A, and B given coefficient X and grid density factor K.

After N, A, and B are determined, the circuit 104 is configured with the following settings:

1) The value A is continuously held at the first input 82.
2) The capacity of the accumulator is set to B.
3) The frequency divider modulus is set to be either N or N+1, depending upon a signal at the modulus control 75. The modulus of the divider is N+1 when the carry out 88 is high (i.e., when a running sum within the accumulator rolls over the capacity B).
4) The internal state of the accumulator is initialized to a value between 0 and B−1. Preferably, the internal state of the accumulator is initialized to B/2.

These settings can be done manually, or by the computer 70, or the circuit can be permanently set with constant values of N, A and B if X and K are constant for the life of the circuit 104

In operation, a squarewave of frequency $KF_0$ enters the frequency divider. The frequency divider outputs frequency $KF_0$/N from output 73. The accumulator adds the digital numbers at first 82 and second 84 inputs every time a transition (high to low or low to high) occurs at the output 73. Since the accumulator output 86 is connected to second input 84, a running sum is generated within the accumulator 76. If the accumulator is initialized with a value of 0, then the running sum has successive values 0, A, 2A, 3A, 4A, and so on up to the capacity B (i.e., A is added to the running sum with every transition of the frequency divider output 73). If the accumulator is initialized with a value of 1/2B, then the running sum has successive values 1/2B, 1/2B+A, 1/2B+2A, 1/2B+3A, and so on up to the capacity B. When the running sum reaches capacity B, the carry out 88 goes high and the frequency divider modulus changes to N+1. While the carry out 88 is high, the frequency divider outputs frequency $KF_0$/N+1. Therefore, the frequency divider output 73 provides alternating segments of frequency $KF_0$/N and frequency $KF_0$/N+1.

For grid density factor K>1, corresponding changes must be made in the RAMP signal. More specifically, RAMP is changed to have K times as many voltage steps 46. This is accomplished by dividing each voltage step in the original RAMP signal (i.e., RAMP for K=1) into K equal voltage steps.

It is now understood that K=1 in the first described example of FIG. 12.

Consider 1/X=I.F, where I is the integer part of 1/X, and F is the fractional part of 1/X (i.e., I=N and F=M for K=1). In the present invention, X is represented by a binary number, and F is represented by a binary number. The number of bits used to represent F is defined to be D. Typically, D is about 4–6 (i.e., F is represented by 4–6 binary digits). In a particularly preferred embodiment of the present invention K=$2^D$. However, K can have any integer value, including values that are not powers of 2. The higher the value for K, the more accurate the analog-to-digital conversion. Also, higher values of K require faster clock speeds.

In all the following algorithms, n is defined as the number of bits of precision desired for the A/D conversion (e.g., n=3 if 3 bits of precision are desired in the A/D conversion).

Algorithms 4–6 for selecting N, A, and B

Algorithm 4

In this simple algorithm,

N=integer part of K/X, i.e., N≤K/X<N+1

B=$2^n$K, and

A=Round(B(frac(K/X))).

Where 'Round' denotes the operation 'round to the nearest integer', and 'frac', denotes the operation 'take the fractional part of'.

Algorithm 5

This algorithm is typically the most efficient. The idea is to express X/K as a fraction B/C as accurately as possible, with the constraint that C is less than a chosen constant. For example, the constraint C<$2^n$K can be used. Then, N, A, and B are obtained from the expression:

$$\frac{B}{C} = N + \frac{A}{B}.$$

The fraction B/C is found using the Stern-Brocot tree as a number system. For more information on using a Stern-Brocot number tree to find the fraction B/C, reference can be made to Concrete Mathematics, p118–122 by Graham., Knuth, and Patashnik.

Algorithm 6

In this algorithm,

B=Round($2^n$XK), where 'Round' denotes the operation 'round to the nearest integer', N=integer part of, $$\frac{K^2 2^n}{B},$$

and

A=$K^2 2^n$mod(B), where 'mod' indicates the modulus function.

In algorithm 6, N is not necessarily equal to the integer part of K/X. In other words N does not necessarily obey the inequality N≦(K/X)<N+1.

It can be seen that algorithms 1–3 are the same as algorithms 4–6 for the specific case of K=1.

The present invention is not limited to algorithms 4–6. Many mathematical techniques can be used to find N, A, and B such that N+(A/B)≈K/X.

As mentioned above, for accurate A/D conversion, N+(A/B) should be close to K/X. How close depends upon the desired bit resolution of the A/D conversion-i.e., it depends on n. For best results, N+(A/B) should be within a factor of (1/2ⁿ) of K/X. For example, for n=1 (1 bit resolution A/D), N+(A/B) should be within 50% of K/X. For n=3, N+(A/B) should be within 12.5% of K/X. However, this is only a preferred guideline, not an absolute requirement in the present invention.

PREFERRED METHOD FOR GENERATING M-RAMP

In the present invention, a RAMP signal for providing multiplication is preferably generated using a digital to analog converter (DAC). Obviously, any DAC has a finite output voltage resolution determined mainly by the digital input, among other factors. For example, an 8-bit DAC can only provide 256 voltages. Therefore, if a DAC is used to generate the RAMP used in FIG. 6, voltage levels 40 could only have voltage values that match one of the 256 voltages obtainable from an 8-bit DAC.

FIG. 7 shows the 0.7M-RAMP signal for X=1.43 as explained above. The voltage levels 40 are increased in voltage by a factor of exactly 1.43 compared to a reference 1-RAMP signal providing no multiplication. The exact voltage levels 40 shown in FIG. 7 for multiplication by 1.43 may not be obtainable from a DAC, however. Therefore, the finite voltage resolution of the M-RAMP generating DAC limits the resolution of the multiplication and A/D conversion in an MCBS device.

Figure 17:
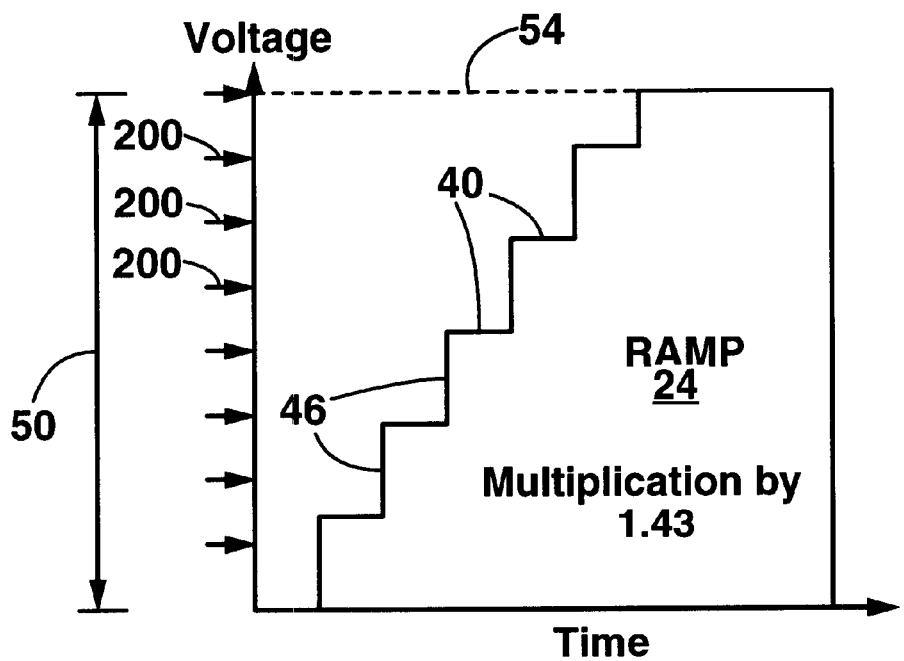
FIG. 17 shows a M-RAMP signal and shows voltages 200 obtainable from a 3-bit D/A converter (DAC).

FIG. 17 shows 8 voltages 200 obtainable from a 3-bitDAC designed for generating M-RAMP signals for voltage range 50. Obtainable voltages 200 generally do not correspond with the voltage levels 40 required for producing the 0.7M-RAMP signal.

However, a 3-bit DAC can produce an M-RAMP signal which approximates the 0.7M-RAMP signal by creating an M-RAMP signal with a 'snap to grid' characteristic. This 'snap to grid' characteristic is analogous to the 'snap to grid', characteristic of M-BITX signals described above.

Figure 18:
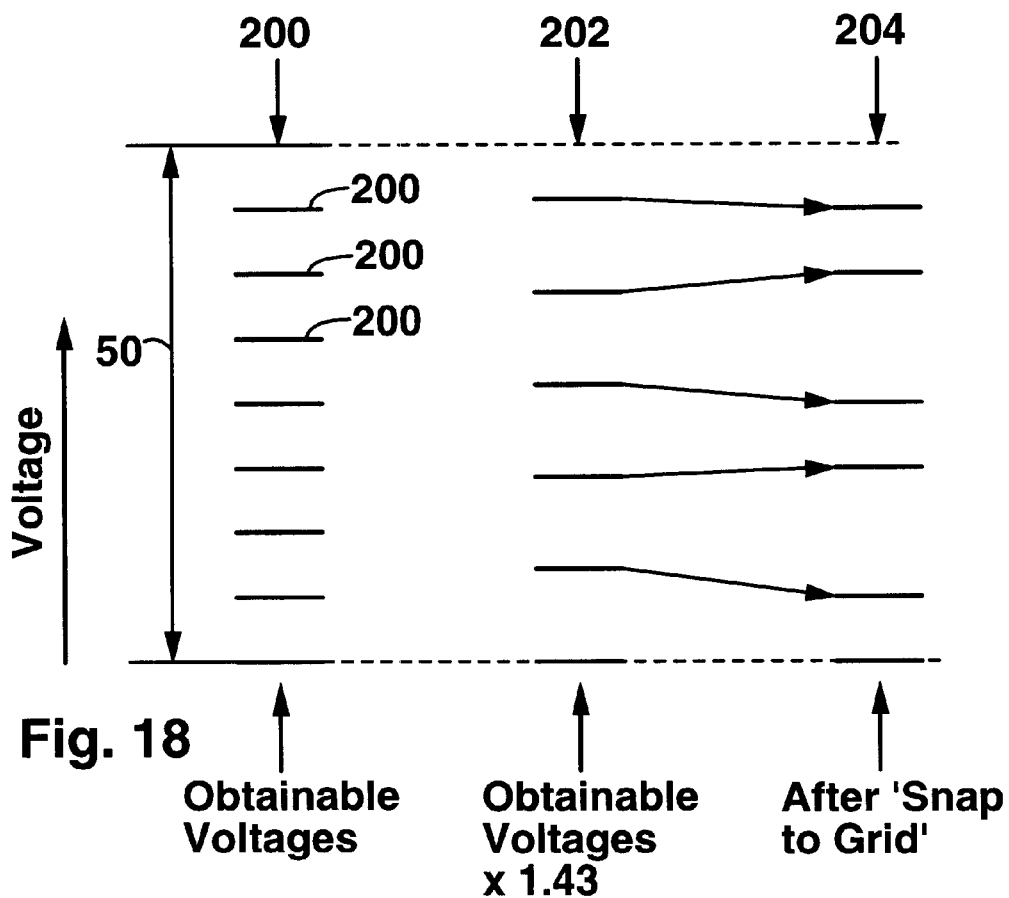
FIG. 18 illustrates the 'snap to grid' concept applied to M-RAMP signals produced by a DAC.

FIG. 18 illustrates the snap to grid characteristic of a M-RAMP signal. Shown are the voltages 200 obtainable from a 3-bit DAC. Obtainable voltages 200 are equally spaced and form a 'grid'. Voltages 202 are the obtainable voltages multiplied by 1.43. Voltages 202 are the voltages of the voltage levels present in the 0.7M-RAMP signal. Voltages 204 are the voltages present in an M-RAMP signal having a 'snap to grid' characteristic. All the voltages 204 are obtainable from a 3-bit DAC. Of course, a snap to grid characteristic is useful in systems with any bit resolution (e.g., 8-bit or any number of bits).

Figure 19:
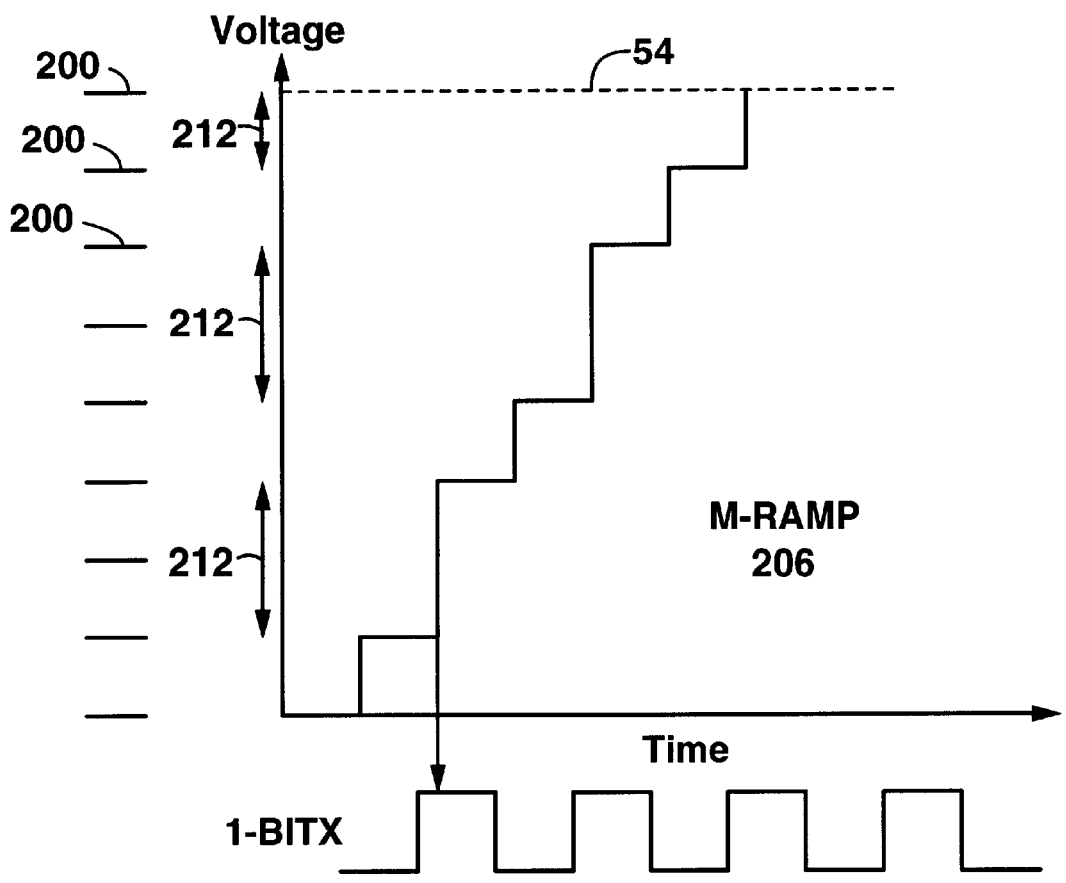
FIG. 19 illustrates the operation of the M-RAMP signal with a snap to grid characteristic.

FIG. 19 shows an M-RAMP signal 206 with a snap to grid characteristic. All voltage levels 210 correspond with obtainable voltages 200. The 1-BITX signal is also shown. Ranges 212 indicate analog input voltages for which the digital output of the MCBS ADC is a 1. Ranges 212 approximately correspond with ranges 52 shown in FIG.

Figures 20A, 20B:
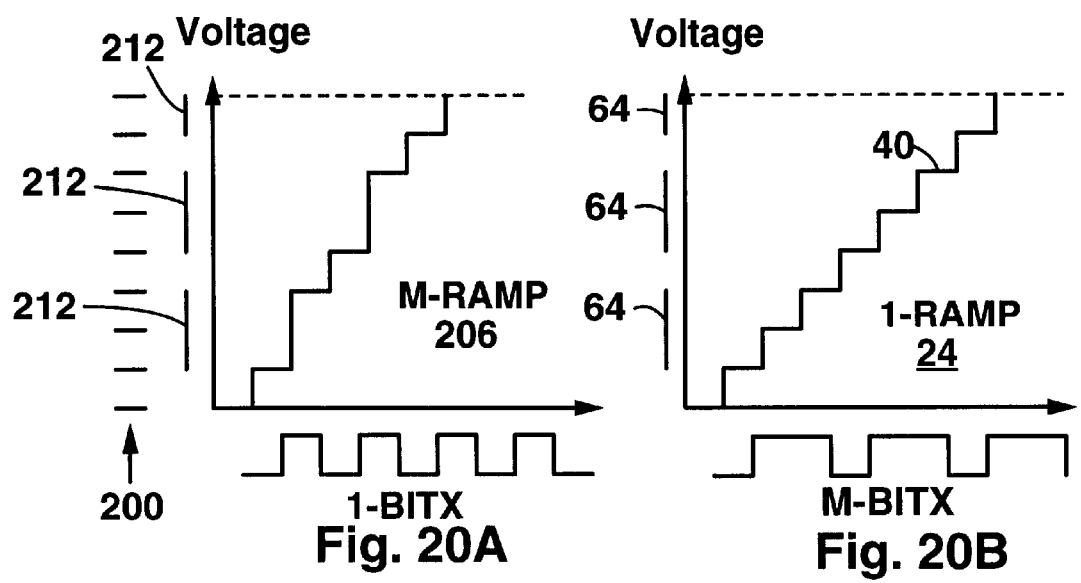
FIGS. 20A and 20B show the operation of M-BITX and M-RAMP signals having snap to grid characteristics.

FIG. 20A shows the present method using M-RAMP with snap to grid and FIG. 20B shows the present method using M-BITX with snap to grid. Ranges 212 for M-RAMP and ranges 64 for M-BITX are equivalent. FIGS. 20A-B illustrates the analogy between M-RAMP and M-BITX where they both have a snap to grid characteristic. In the case of M-RAMP, the 'grid' 200 is determined by the voltages available from a DAC. In the case of M-BITX, the 'grid' is determined by the time locations 56, 96 of the M-RAMP voltage steps. M-BITX provides accurate multiplication when M-RAMP has a large number of voltage steps (i.e., time locations 56, 96 are closely spaced). Similarly, M-RAMP provides accurate multiplication when the DAC used to generate M-RAMP has a high bit resolution.

The M-RAMP signal with snap to grid is not necessarily generated using a discrete device which performs a 'snap to grid' operation on the voltages 202. However, it is best for any M-BITX signal to have a 'snap to grid', characteristic. It is noted that any method of producing an M-RAMP signal with a 'snap to grid' characteristic is within the scope of the present invention. A preferred technique is discussed below.

However, it is not obvious how to generate the M-RAMP signal having a snap to grid characteristic for any coefficient X.

Figure 21:
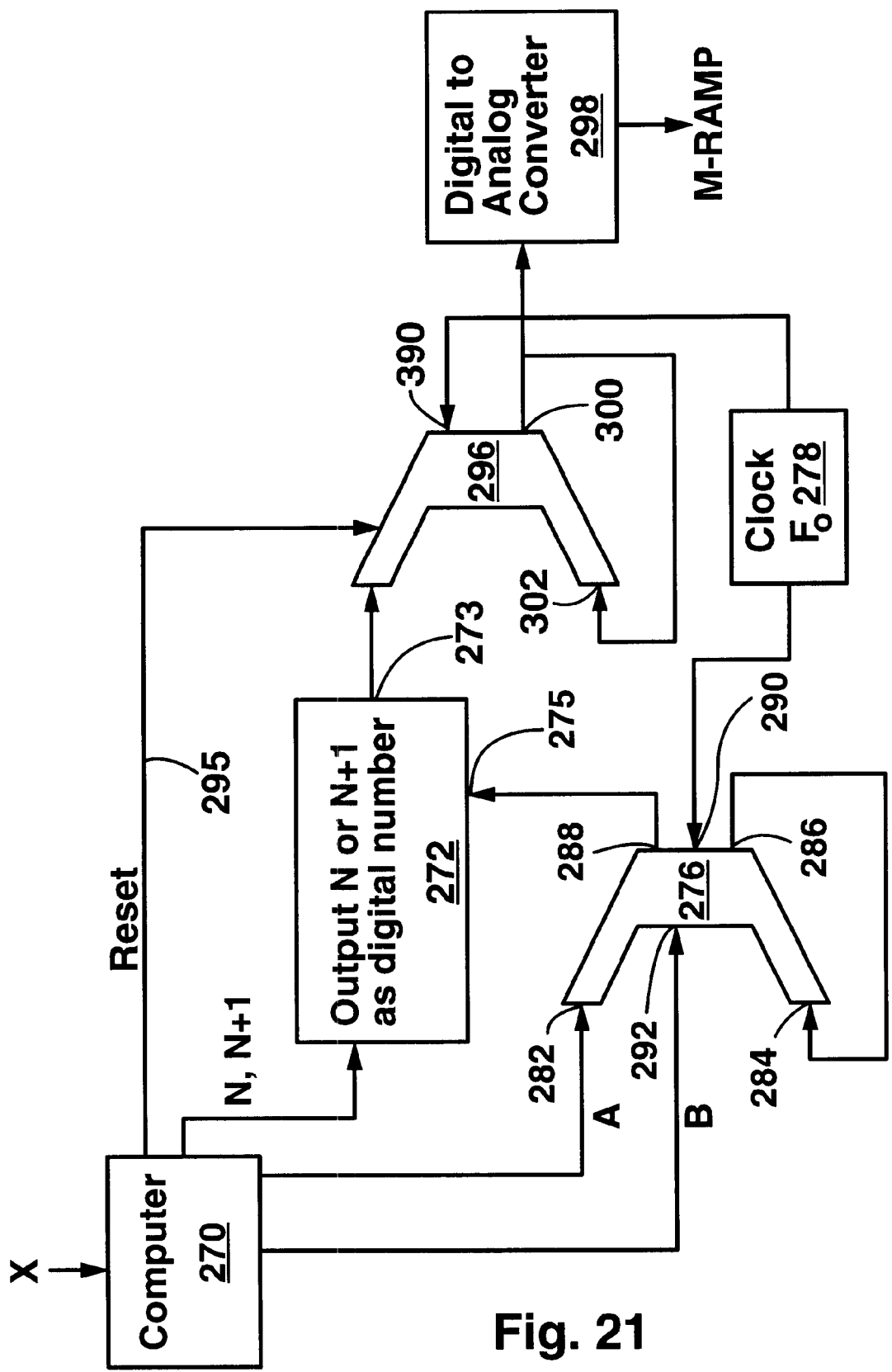
FIG. 21 shows a circuit for generating an M-RAMP signal having a snap to grid characteristic.

FIG. 21 shows a circuit 268 according to the present invention for generating an M-RAMP signal having a snap to grid characteristic for any coefficient X. Circuit 268 is very similar to circuit 68 for generating M-BITX shown in FIG. 12.

The circuit 268 includes a computer 270, a digital number selector 272, a first accumulator 276 (digital adder), a second accumulator 296, a clock 278, and a digital to analog converter 298. The number selector has an output 273, and a control 275.

The first accumulator 276 has a first input 282, a second input 284, an output 286, a carry out 288, an edge-sensitive trigger 290, and a capacity set input 292. The carry out 288 is connected to the control 275. The output 286 of the first accumulator is connected to the second input 284. The computer 270 also has a reset control 295 for resetting the internal state of the second accumulator to zero.

The second accumulator 296 is connected to receive digital numbers (N or N+1) from the number selector 272. An output 300 of the second accumulator 296 is connected to an input 302 so that the second accumulator generates a running sum.

The clock 278 provides a squarewave signal at frequency $F_0$ that is connected to first accumulator trigger 290 and second accumulator trigger 390. Accumulators 276, 296 are triggered to add with every transition edge (positive going and negative going transitions) of the clock signal. Therefore, accumulators 276 296 add at a frequency of $2F_0$. It practice, it may be necessary to delay the operation of second accumulator 296 so that electrical signals have time to propagate from first accumulator 276.

In operation, the computer 270 determines numbers N, A, and B based on the relation:

$$N + \frac{A}{B} \approx \frac{K}{X}.$$

Values of N+(A/B) close to the value of K/X provide accurate A/D conversion and multiplication. N is an integer. Values of N, A, and B can be selected using algorithms 1–6 discussed above.

After N, A, and B are selected, the circuit 68 is configured with the following settings:

1) The value A is continuously provided at the first accumulator first input 282.
2) The capacity of the first accumulator is set to B.
3) The number selector is set to provide either N or N+1 at output 273, depending upon a signal at the control 275. The output of the selector is N+1 when the carry out 288 is high (i.e., when a first running sum within the first accumulator rolls over the capacity B). The output of the selector 272 is N when the carry out 288 is low.
4) The internal state of the first accumulator is initialized to a value between 0 and B-1. Preferably, the internal state of the first accumulator is initialized to B/2.
5) The capacity of the second accumulator is preferably set to equal the maximum value receivable by the digital to analog converter 298. (e.g., capacity is 8 for a 3-bit DAC 298).
6) The internal state of the second accumulator is initialized (i.e., reset) to zero.

These settings can be done manually, or by the computer 270, or the circuit can be permanently set with constant values of N, A and B if X is constant for the life of the circuit 268. The second accumulator 296 must be reset to zero after every M-RAMP signal is generated. Also, the first accumulator must be reset to a value between 0 and B-1 after every M-RAMP signal is generated.

In operation, circuit 268 works in much the same fashion as circuit 68 in FIG. 12. As clock oscillates, first accumulator 276 produces a running sum (e.g., 0, A, 2A, 3A, 4A . . . ). Also, second accumulator produces running sum (e.g., 0, N, 2N, 3N, 4N . . . ). The running sum in the second accumulator is input into the DAC. The DAC produces an analog output voltage proportional to the second accumulator running sum. Since the second accumulator running sum increases discontinuously, the DAC provides a staircase waveform output.

When the first accumulator running sum reaches capacity B, the carry out 288 goes high, and number selector 272 provides N+1 to the second accumulator 296. Therefore, while the carry out is high, the DAC analog voltage output increases in steps proportional to N+1.

When the carry out 288 returns low, the DAC output increases in steps proportional to N.

It is noted that the DAC should have a bit resolution proportional to K. Therefore, for large K values, the voltage steps have smaller magnitudes.

In this way, the DAC output provides two different magnitude voltage steps. The different voltage steps are produced such that an average slope (voltage/time slope measured over a very long time period) of the DAC output is close to T/X (where T is the voltage/time slope of 1-RAMP). The voltage steps of 1-RAMP are defined as having magnitude V. Therefore, the voltage steps of M-RAMP have magnitudes VN/K and V(N+1)/K. The two different voltage step magnitudes (VN/K and V(N+1)/K) are generated in patterns that result in M-RAMP having an average slope of T/X.

After the M-RAMP signal is generated, the second accumulator is reset to zero, and the first accumulator is reset to its original initialized value. Then another M-RAMP signal can be generated to provide the next bit in the MCBS ADC output.

In the case where a grid density factor K≠1 is used, the clock frequency is $KF_0$. Also, the voltage steps of the DAC output are divided by a factor of K. All other components and settings remain unchanged.

APPLICATION TO IMAGE SENSORS

In the following discussion, BITX and RAMP indicate signals that may or may not provide multiplication.

Figure 22:
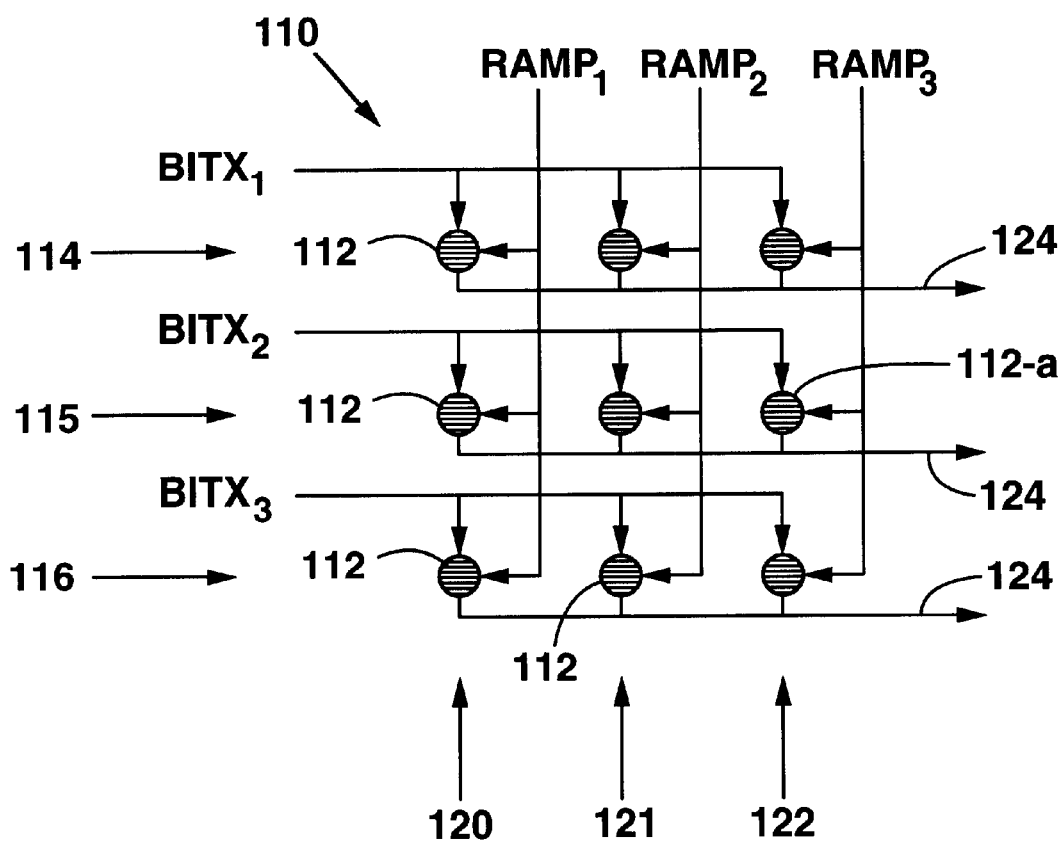
FIG. 22 shows an image sensor (having a 3×3 pixel array) according to the present invention. The array uses the method of the present invention for data compression.

FIG. 22 shows an image sensor 110 that provides simultaneous A/D conversion and multiplication for the analog values generated by each pixel. The image sensor 110 has pixels 112, and each pixel has a bit serial ADC. In operation, $BITX_1$, $BITX_2$ and $BITX_3$ are input to all the pixels in rows 114, 115, 116 respectively. Each of $BITX_1$, $BIT_{X2}$, and $BITX_3$ provide multiplication by a different coefficient, $B_1$, $B_2$, and $B_3$. $RAMP_1$, $RAMP_2$, and $RAMP_3$ are input to all the pixels in columns 120, 121, 122, respectively. Each of $RAMP_1$, $RAMP_2$, and $RAMP_3$ provide multiplication by a different coefficient, $R_1$, $R_2$, and $R_3$. For example, an analog value from pixel 112-a is digitized and multiplied by a factor of $B_2R_3$. Digitized and multiplied signals are provided at outputs 124. This multiplication scheme provides for image data compression according to the well-known MPEG and JPEG standards. More generally, this multiplication scheme can provide data compression or filtering according to any 2-D separable transform technique.

In operation, the $BITX_1$, $BITX_2$ and $BITX_3$ signals can be generated by three different BITX generators such as the circuits disclosed herein. The $RAMP_1$, $RAMP_2$, and $RAMP_3$ signals can be generated by three different DACS. Alternatively, a single BITX generator is used to generate $BITX_1$, $BITX_2$ and $BITX_3$, and the output is multiplexed to the different rows 114, 115, 116, respectively. Also alternatively, a single RAMP generator is used to generate $RAMP_1$, $RAMP_2$, and $RAMP_3$, and the output is multiplexed to the different columns 120, 121, 122, respectively. Further, look-up tables can be used to store digital information on the design of RAMP and BITX signals. Then, this information is retrieved and converted into BITX and RAMP signals.

Figure 23:
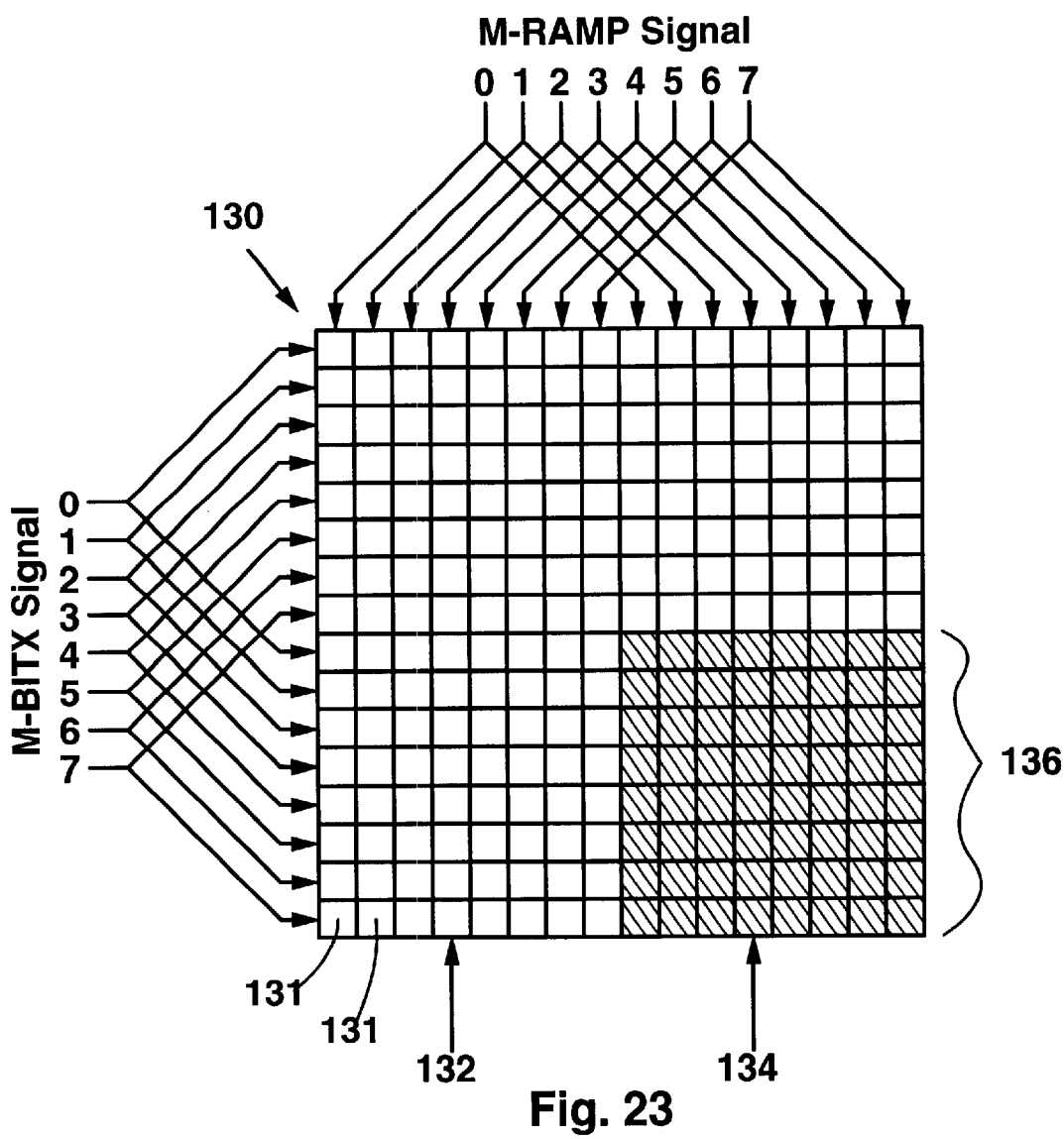
FIG. 23 shows a 16×16 imaging pixel array according to the present invention. The array processes data in four 8×8 pixel blocks.

An important consideration in using the present invention is matching the number of BITX and RAMP signals available with a block size used for 2-D separable transforms (e.g., DCT, JPEG, MPEG, convolution or high/low pass filtering). For example, consider a particular imaging device in which 8 different RAMP and 8 different BITX signals are available. In this case, it is obvious that compression/filtering can be performed using 8×8 blocks of pixels in the imaging device. FIG. 23 shows a 16×16 pixel array 130 comprising individual pixels 131. Data compression is performed on four 8×8 blocks according to the present invention. One of the four blocks is hatched 136. Since 8×8 blocks are used, 8 RAMP signals (labeled 0–7) and 8 BITX signals (labeled 0–7) are necessary. Each RAMP signal is provided to two columns, and each BITX signal is provided to two rows. For example, RAMP signal 3 is provided to both column 4 132 and column 12 134.

Figure 24:
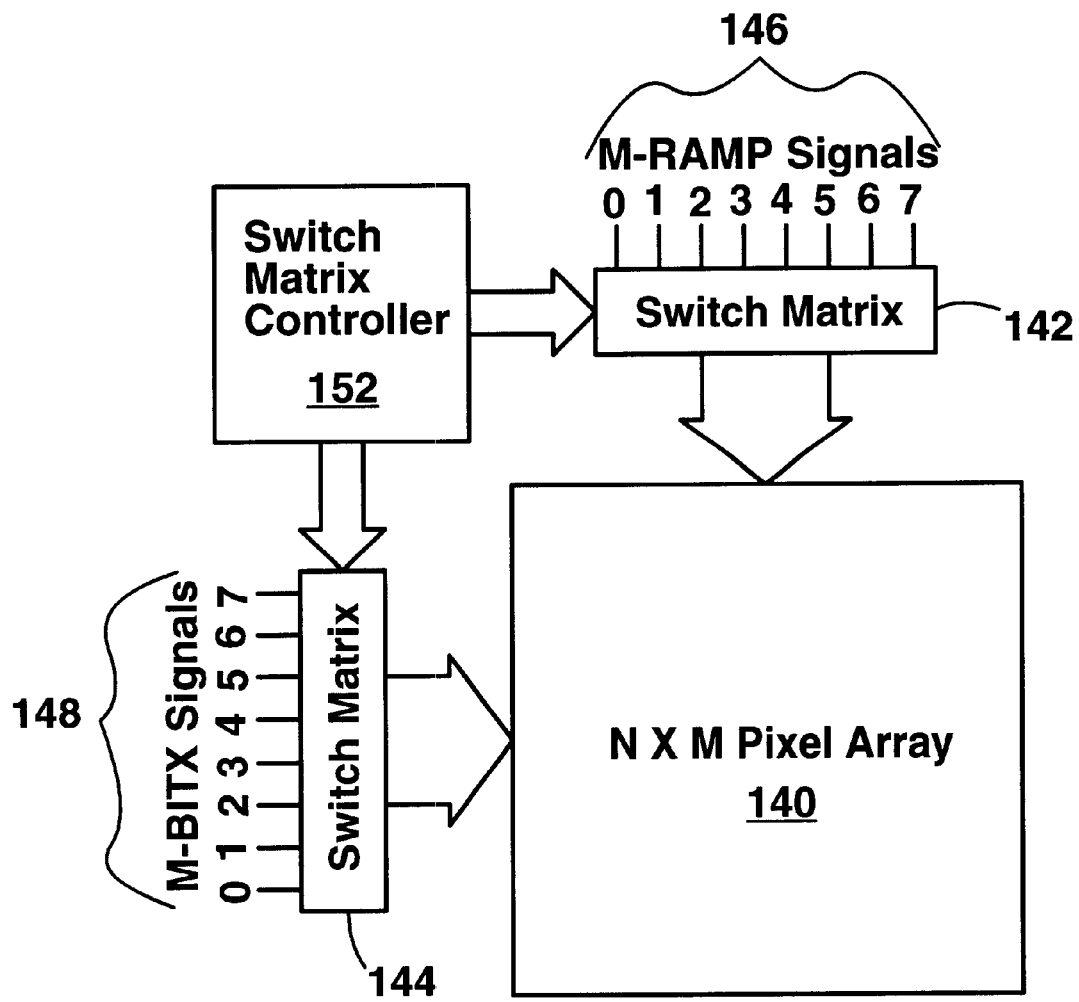
FIG. 24 shows an embodiment of the present invention in which switch matrices are used to route M-RAMP and M-BITX signals to the appropriate rows and columns in the array.

In some cases it is desirable to change the block size (e.g., for using different compression/filtering algorithms). FIG. 24 shows an embodiment of the present invention capable of changing the block sizes used in performing data compression/filtering. The device has an pixel array 140, such as an imaging array of photodetectors. In performing data compression/filtering, the pixel array 140 is divided into blocks for processing. Blocks can be many different sizes depending upon the compression/filtering algorithm used. The blocks can be square or rectangular. Examples include 8×8, 2×2, 3×3, 16×16, 2×3, or 3×4 pixel blocks.

The apparatus of FIG. 24 has a first switch matrix 142 and a second switch matrix 144. The first switch matrix 142 receives RAMP signals 0–7 146; the second switch matrix 144 receives BITX signals 0–7 148. The first switch matrix 142 routes the RAMP signals to the appropriate column. The second switch matrix 144 routes the BITX signals to the appropriate row. Most generally, the first switch matrix 142 allows any column to receive any RAMP signal (any one of RAMP signals 0–7). The second switch matrix 144 allows any row to receive any BITX signal (any one of BITX signals 0–7). The appropriate RAMP and BITX signals for the rows and columns depends upon the block size and compression/filtering algorithm. Switch matrices may be dynamically controlled by switch matrix controller 152.

Figure 25:
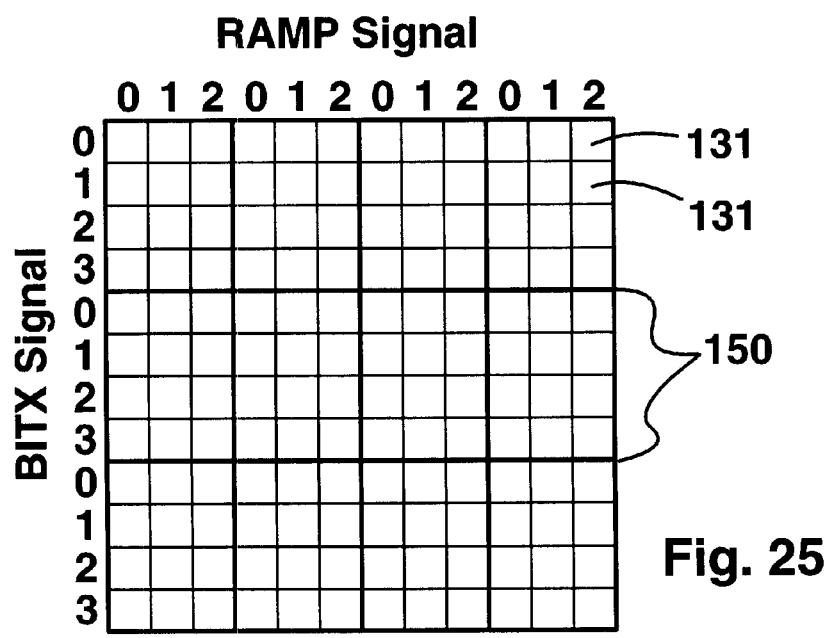
FIG. 25 shows a 12×12 imaging pixel array that processes data from in 3×4 pixel blocks.

FIG. 25, for example, shows a specific case in which a 12×12 pixel array is processed in 3×4 blocks 150 of pixels 131. Every third column receives the same RAMP signal (0, 1, or 2), and every fourth row receives the same BITX signal (0, 1, 2, or 3). The RAMP and BITX signals are directed to the appropriate rows and columns by the switch matrices 142, 144. (in this particular example, RAMP signals 3–7 are unused and BITX signals 4–7 are unused). It is understood that rows and columns are interchangeable and equivalent by turning the device 90 degrees. The terms 'row' and 'column' only serve to indicate horizontal and vertical alignment in the drawing and do not indicate any fundamental difference in the operation of the pixels or bit serial ADCs associated with the pixels.

In the example of FIG. 24, 8 different RAMP signals and 8 different BITX signals are provided to the first and second switch matrices 142, 144. Therefore, the largest block that can be processed is an 8×8 block. Smaller block sizes can be processed by using only a portion of the RAMP and BITX signals as described above for 3×4 blocks. For example, for 3×3 blocks, 3 different RAMP signals and 3 different BITX signals are required. It is also understood that different numbers of RAMP and BITX signals may be provided to the switch matrices 142, 144.

If 8 RAMP and 8 BITX signals are provided, then blocks up to 8×8 can be processed. For smaller blocks, it is necessary to use the switch matrices 142, 144 to properly route the RAMP or BITX signals. The number of configurations necessary to allow the use of blocks of all possible sizes up to the maximum size (8×8 in the present example) is determined by the number of RAMP and BITX signals. For 8 signals, 5 configurations are necessary for each switch matrix. This is illustrated in the Table below.

| Different Configurations of Switch Matrix for 8 Input Signals | |
| --- | --- |
| Configuration | Block Length in Pixels |
| 1 | 2, 4, 8 |
| 2 | 3, 6 |
| 3 | 5 |
| 4 | 6 |
| 5 | 7 |

Block lengths of 2, 4, and 8 pixels are handled by the same switch matrix configuration because 2 and 4 divide evenly into 8. A similar argument accounts for why the same matrix configuration can be used for blocks 3 and 6 pixels on a side (3 divides evenly into 6). The number of configurations required is always equal to N/2 rounded to the next highest integer ('averaged up'), where N is the number of RAMP or BITX signals provided. The table below shows the number of switch matrix configurations for different numbers of RAMP or BITX signals.

| Number of Signals (RAMP or BITX signals) | Number of Configurations of Associated Switch Matrix |
| --- | --- |
| 9 | 5 |
| 10 | 5 |
| 11 | 6 |
| 12 | 6 |

MULTIPLICATION IN A SINGLE SLOPE ADC

Figure 26A:
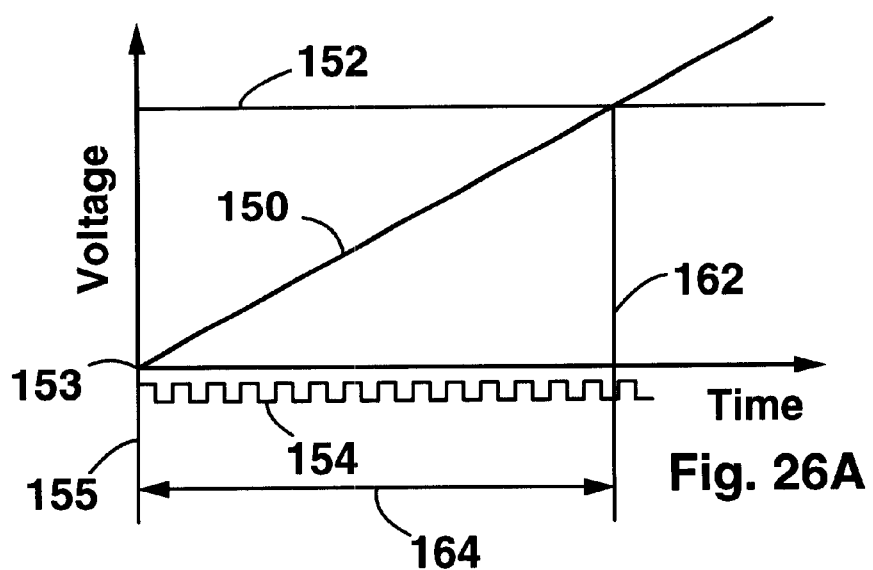
FIGS. 26A–26B illustrate the operation of a single slope ADC.
Figure 26B:
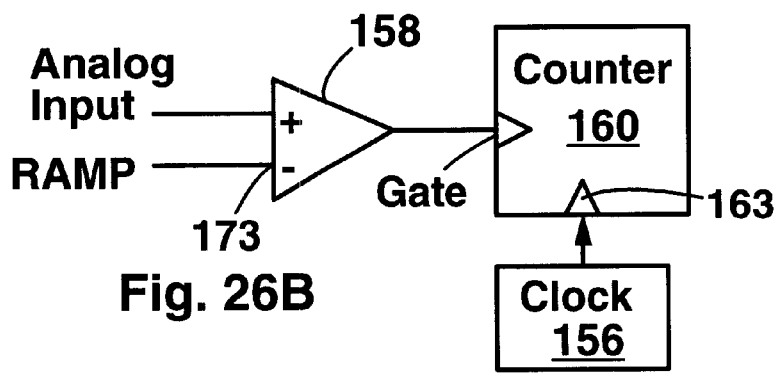

The present invention includes methods for providing simultaneous multiplication and A/D conversion in a single-slope ADC. Single slope ADCs are well known in the art. FIG. 26A shows a timing diagram illustrating the operation. FIG. 26B shows a single slope A/D converter. In a single slope converter, a SS-RAMP waveform 150 is input to a SS-RAMP input 173 of a comparator 158. The comparator 158 compares the SS-RAMP and an analog voltage 152. The SS-RAMP 150 has a precisely defined voltage vs. time slope and starts at zero volts 153. A clock 156 generates an oscillatory signal SS-FREQ 154 of a precise frequency. SS-FREQ 154 is provided to a SS-FREQ input 163 of a counter 160 which counts the periods in the signal 154. The counter begins counting at point 155. The counter is connected to comparator such that the counter 160 stops counting at point 162, i.e., when the SS-RAMP 150 exceeds the analog voltage 152. Therefore, counter 160 counts for duration 164. The number of periods counted by counter in duration 164 provides a digital measurement of the analog voltage 152.

The digital output of the single slope ADC of FIG. 26B is given by:

$$D_{Out} = \frac{QV_a}{S}.$$

Where $V_a$ is the analog voltage input, S is the slope of SS-RAMP, and Q is the frequency of the SS-FREQ 154.

For any single slope ADC, there exists 1-SS-RAMP and 1-SS-FREQ that provides a digital output having an accurate representation of the analog voltage. In the present description, 1-SS-RAMP is defined as having slope S, and 1-SS-FREQ is defined as having frequency Q. 1-SS-RAMP and 1-SS-FREQ are considered to provide no multiplication of the digital output (i.e., multiplication by a factor of 1).

Figure 27:
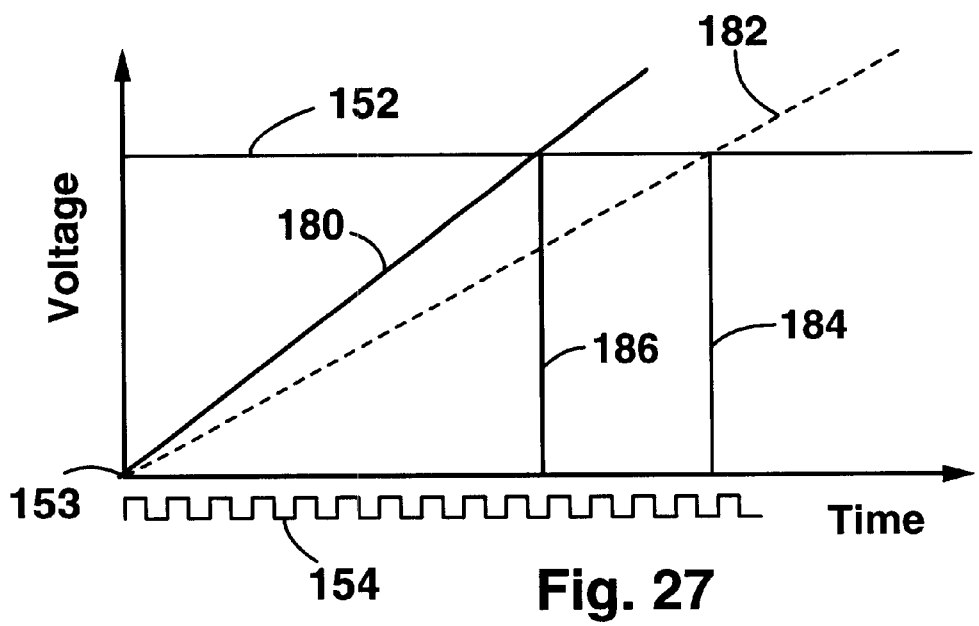
FIG. 27 illustrates a method of the present invention in which multiplication is performed in an single slope ADC by changing the slope (voltage/time) of a SS-RAMP signal used in the ADC.

In one aspect of the present invention, simultaneous A/D conversion and multiplication by a coefficient X are provided by using an M-SS-RAMP (a "multiplying single slope ramp signal") having slope SIX. FIG. 27 shows a timing diagram with M-SS-RAMP 180 having slope SIX where X=3/4. 1-SS-RAMP 182 is also shown. For analog input 152, counter stops at point 184 if 1-SS-RAMP is used. Counter stops at point 186 if M-SS-RAMP is used since M-SS-RAMP has a higher slope. M-SS-RAMP therefore results in a ¼ smaller digital output from counter, and hence multiplication of the digital output by a factor of X=3/4. Of course, multiplication can also be achieved for X>1 by using M-SS-RAMP that has a slope smaller than the slope S.

Figure 28:
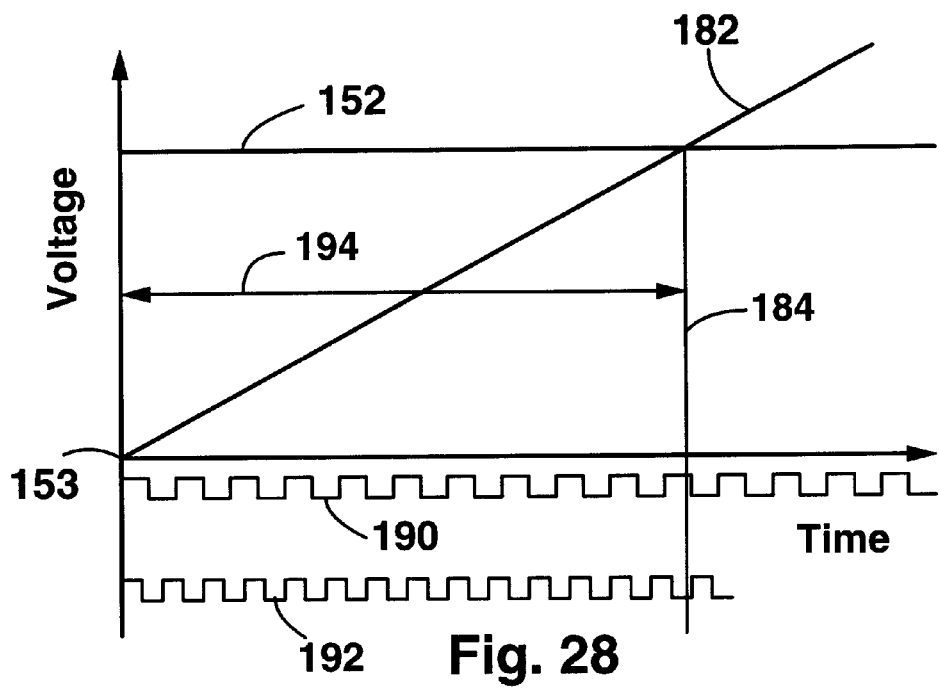
FIG. 28 illustrates a method of the present invention in which multiplication is performed in an single slope ADC by changing the frequency of a SS-FREQ signal used in the ADC.

In another aspect of the present invention, simultaneous A/D conversion and multiplication by a coefficient X are provided by using an M-SS-FREQ (a "multiplying single slope frequency signal") having frequency QX. FIG. 28 shows a timing diagram with M-SS-FREQ 190 having frequency QX where X=3/4. 1-SS-FREQ 192 is also shown. 1-SS-RAMP 182 stops at point 184, thereby allowing counter to count for duration 194. For analog input 152, counter counts more periods in duration 194 if 1-SS-FREQ 192 is used. Counter counts ¼ fewer periods in duration 194 if M-SS-FREQ 190 is used. M-SS-FREQ therefore results in a ¼ smaller digital output from counter, and hence multiplication of the digital output by a factor of X=3/4. Of course, multiplication can also be achieved for X>1 by using M-SS-FREQ that has a frequency higher than the frequency Q.

It is important to note that the M-SS-FREQ signal can be generated using a fractional-N PLL synthesis technique. Fractional-N PLL synthesis is preferred because the average frequency of M-SS-FREQ can be accurately controlled. Also, M-SS-RAMP can be generated using a fractional-N PLL synthesis technique. In this case, M-SS-RAMP is actually a stairstepped waveform with a large number of steps. The large number of steps in M-SS-RAMP approximates a smoothly changing RAMP signal.

Also, M-SS-FREQ and M-SS-RAMP can be generated from a look-up table in an electronic memory.

Multiplication using M-SS-FREQ and multiplication using M-SS-RAMP can be performed simultaneously. The present invention includes the possibility of multiplication by two coefficients: one coefficient determined by M-SS-RAMP, the other coefficient determined by M-SS-FREQ.

Figure 29:
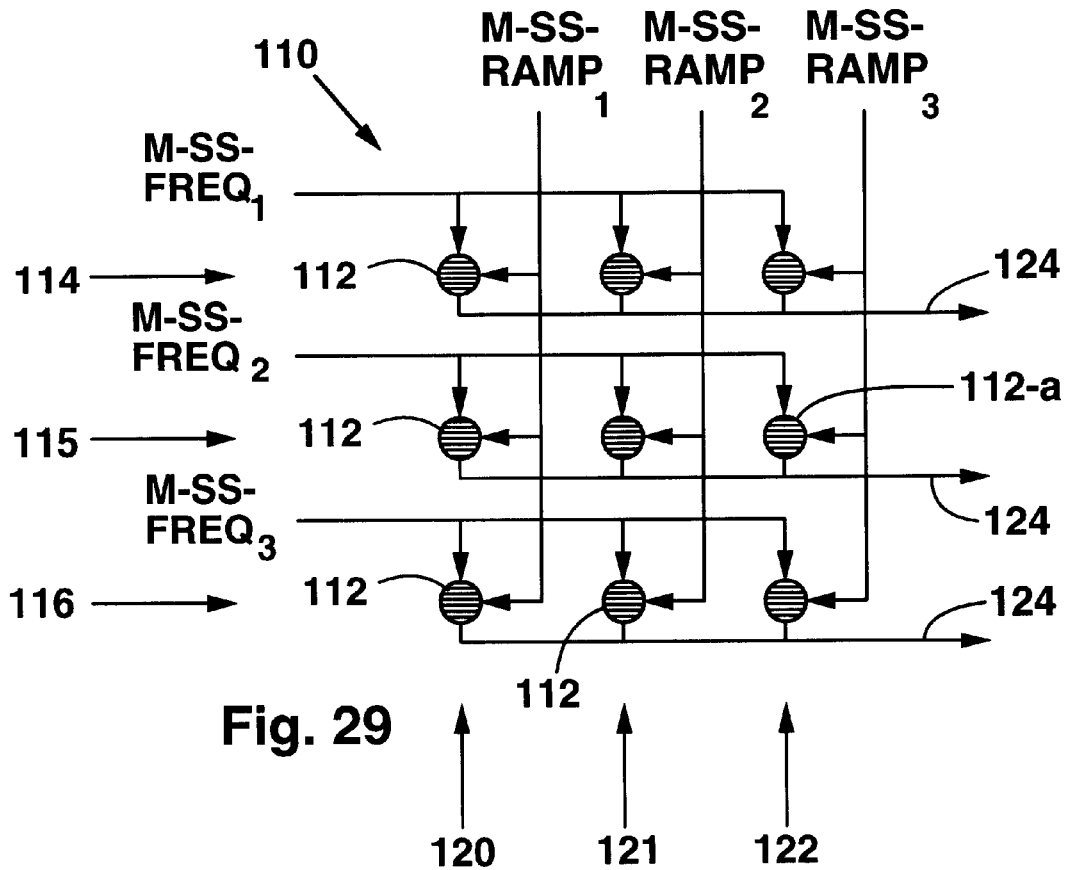
FIG. 29 shows an imaging pixel array that uses single slope ADCs for simultaneous A/D conversion and data compression.

In a particular application, data compression/filtering is provided in an imaging array of photodetectors using single slope ADCs. FIG. 29 shows such a device having a 3×3 array of pixels 112. FIG. 29 is very similar to FIG. 22, except that BITX and RAMP signals of FIG. 17 are replaced with M-SS-FREQ and M-SS-RAMP signals. Also, each pixel 112 has an associated single slope ADC, instead of a bit serial ADC as in FIG. 22 (ADCs are not shown). The single slope ADCs can be located on the same chip as the photodetectors, or on an external chip.

In operation, M-SS-FREQ$_1$, M-SS-FREQ$_2$ and M-SS-FREQ$_3$ are each input to all the pixels in rows 114, 115, 116 respectively. Each of M-SS-FREQ$_1$, M-SS-FREQ$_2$ and M-SS-FREQ$_3$ provide multiplication by a different coefficient, $F_1$, $F_2$, and $F_3$. M-SS-RAMP$_1$, M-SS-RAMP$_2$, and M-SS-RAMP$_3$ are each input to all the pixels in columns 120, 121, 122, respectively. Each of M-SS-RAMP$_1$, M-SS-RAMP$_2$, and M-SS-RAMP$_3$ provide multiplication by a different coefficient, $R_1$, $R_2$, and $R_3$. For example, an analog value from pixel 112-$a$ experiences digitization and multiplication by a factor of $F_2R_3$. Digitized and multiplied signals are provided at outputs 124. This multiplication scheme provides for image data compression according to the well-known MPEG and JPEG standards. More generally, this multiplication scheme can provide data compression or filtering according to any 2-D separable transform technique.

It is also noted that switch matrices can be used in combination with single slope ADCs and M-SS-RAMP and M-SS-FREQ signals.

The present invention includes the possibility of locating the analog-to-digital converters externally to the photodetector array. In this case, analog signals from the photodetectors are communicated to a separate chip or component for analog-to-digital conversion. Even though the analog-to-digital conversion does not take place on the photodetector array, the method of the present invention can still be practiced. More specifically, multiplication can be performed by providing appropriate M-BITX signals to analog-to-digital converters communicating with photodetectors on different rows. Also, appropriate M-RAMP signals are provided to analog-to-digital converters communicating with photodetectors on different columns. It is noted that it is preferred to locate the analog-to-digital converters on the same chip as the photodetectors, however.

It is important to note that M-BITX and M-RAMP generators do not necessarily need to be provided to perform the present invention. If a set of multiplication coefficients is predetermined, then, M-BITX and M-RAMP can be stored in a computer memory such as a look-up table. This may be the case in an imaging device where only a single, specific data compression/filtering techniques is used. For example, in performing a particular data compression process on data from an imaging array, only a few (e.g., 8) M-BITX signals and a few (e.g., 8) M-RAMP signals need to be used. The 8M-BITX signals and 8 M-RAMP signals needed can be stored in computer memory and reproduced using a DAC. Therefore, the present invention can be performed without using circuits such as shown in FIGS. 12, 16, and 21.

It is also noted that the present invention can be used with many types of pixel arrays arranged in many different geometrical patterns. The pixels do not need to be arranged in a rectangular grid, as shown in many of the drawings. The pixels can be arranged in a hexagonal array, in which case the 'rows' and 'columns' are not straight lines. Also, the pixels can be arranged in a radial pattern, with the 'rows' arranged along radial lines, and the 'columns' consisting of circles that circumscribe the center of the radial line pattern. The terms 'row' and 'column' are to be interpreted broadly. The terms 'row' and 'column' encompass any two sets of lines (curved or straight) that intersect. The present invention can be used with any pixel array that has a structure compatible with 2-dimensional separable transforms (i.e., any pixel array that can be described as having intersecting lines of pixels).

Although the present invention has been described mainly with reference to imaging photodetector arrays, the present invention can be used in any situation where a large number of analog signals need to be digitized, and the resulting data compressed or filtered according to a 2-dimensional separable transform. For example, analog signals from a large number of microphones or magnetic field sensors can be digitized and compressed/filtered using the present invention.

It is further generalized that M-RAMP, M-BITX, M-SS-RAMP, and M-SS-FREQ can be termed column-control and row-control signals. The control signals control the operation of ADCs in a sensor array to affect multiplication by desired coefficients. If both column and row control signals are used, then each analog signal in the array is multiplied by two coefficients.

It will be clear to one skilled in the art that the above embodiments may be altered in many ways without departing from the scope of the invention. Accordingly, the scope of the invention should be determined by the following claims and their legal equivalents.

What is claimed is:

1. A method for converting an analog value to a digital output value scaled by an arbitrary factor X, the method comprising:
   a) generating a predetermined FREQ signal;
   b) selecting the arbitrary factor X;
   c) generating from the factor X and from predetermined reference voltage levels a multiplying signal having voltage levels scaled by a factor of 1/X relative to the predetermined reference voltage levels;
   d) applying the multiplying signal, the FREQ signal, and the analog signal to a single slope analog-to-digital converter;

e) generating at the output of the single slope analog-to-digital converter the digital output value having multiple bits of precision;

wherein the scaling of the voltage levels of the multiplying signal results in a scaling of the digital output value by the factor X relative to the analog value.

2. A method for converting an analog value to a digital output value scaled by an arbitrary factor X, the method comprising:
   a) generating a predetermined RAMP signal;
   b) selecting the arbitrary factor X;
   c) generating from the factor X and from a predetermined reference frequency a multiplying signal having an average frequency scaled by a factor of X relative to the predetermined reference frequency;
   d) applying the RAMP signal, the multiplying signal, and the analog signal to a single slope analog-to-digital converter;
   e) generating at the output of the single slope analog-to-digital converter the digital output value having multiple bits of precision;

wherein the scaling of the average frequency of the multiplying signal results in a scaling of the digital output value by the factor X relative to the analog value.

3. A method for converting an analog value to a digital output value scaled by a product of an arbitrary factor X1 and an arbitrary factor X2, the method comprising:
   a) selecting the arbitrary factor X1 and the arbitrary factor X2;
   b) generating from the factor X1 and from predetermined reference voltage levels a first multiplying signal having voltage levels scaled by a factor of 1/X1 relative to the predetermined reference voltage levels;
   b) generating from the factor X2 and from a predetermined reference frequency a second multiplying signal having an average frequency scaled by a factor of X2 relative to the predetermined reference frequency;
   c) applying the first multiplying signal, the second multiplying signal, and the analog signal to a single slope analog-to-digital converter;
   d) generating at the output of the single slope analog-to-digital converter the digital output value;

wherein the scalings of the first multiplying signal and the second multiplying signal result in a scaling of the digital output value by a factor of X1*X2 relative to the analog value.

4. The method of claim 3 implemented in parallel to perform a 2-dimensional separable transform of analog signals derived from an imaging sensor array.

5. A method for converting an analog value to a serial digital output value scaled by an arbitrary factor X, the method comprising performing the following steps to produce each bit of precision of the serial digital output value:
   a) generating a predetermined BITX signal;
   b) selecting the arbitrary factor X;
   c) generating from the factor X and from predetermined reference voltage levels for the distinct bit of precision being produced a multiplying signal having discrete voltage levels scaled by a factor of 1/X relative to the predetermined reference voltage levels;
   d) applying the multiplying signal, the BITX signal, and the analog signal to a bit serial analog-to-digital converter;
   e) generating at the output of the bit serial analog-to-digital converter an output bit corresponding to the bit of precision of the serial digital output value being produced;

wherein the scaling of the multiplying signal results in a scaling of the serial digital output value by the factor X relative to the analog value.

6. The method of claim 5 wherein the multiplying signal has voltage steps of magnitude VN/K and V(N+1)/K, where V is a predetermined voltage step magnitude of the predetermined reference voltage levels, and where N and K are integers selected so that the multiplying signal has an average slope of approximately T/X, where T is an average slope of the predetermined reference voltage levels.

7. The method of claim 5 wherein generating the multiplying signal comprises selecting integers A, B and N such that $N+(A/B) \approx K/X$.

8. The method of claim 7 wherein generating the multiplying signal further comprises performing the following steps at a rate of $2KF_0$, where $F_0$ is an average frequency of the predetermined BITX signal:
   1) adding A to a first running sum;
   2) producing a digital number having a value N if the first running sum does not roll over B during step (1);
   3) producing a digital number having a value N+1 if the first running sum does roll over B during step (1);
   4) adding the produced digital number to a second running sum; and
   5) converting the second running sum to a digital number.

9. The method of claim 7 wherein N=integer part of K/X, $B=2^n K$, and $A=\text{Round}(B(\text{Frac}(K/X)))$, where n is a number of bits of resolution desired for analog-to-digital conversion.

10. The method of claim 7 wherein $B=\text{Round}(2^n XK)$, N=integer part of $K^2 2/B$, and $A=K^2 2^n \bmod(B)$, where n is a number of bits of resolution desired for analog-to-digital conversion.

11. The method of claim 7 wherein $B/C=N+(A/B)$, where C is selected to be less than a predetermined constant and B/C is selected from a Stern-Brocot number tree such that B/C is as close as possible to K/X given the predetermined constant.

12. A method for converting an analog value to a serial digital output value scaled by an arbitrary factor X, the method comprising performing the following steps to produce each bit of precision of the serial digital output value:
   a) generating a predetermined RAMP signal;
   b) selecting the arbitrary factor X;
   c) generating from the factor X and from a predetermined reference signal for the distinct bit of precision being produced a multiplying signal having an average frequency scaled by a factor of X relative to an average frequency of the predetermined reference signal;
   d) applying the RAMP signal, the multiplying signal, and the analog signal to a bit serial analog-to-digital converter;
   e) generating at the output of the bit serial analog-to-digital converter an output bit corresponding to the bit of precision of the serial digital output value being produced;

wherein the scaling of the multiplying signal results in a scaling of the serial digital output value by a factor of X relative to the analog value.

13. The method of claim 12 wherein the multiplying signal has alternating segments of frequency $KF_0/N$ and $KF_0/(N+1)$, where $F_0$ is the average frequency of the predetermined reference signal, and where N and K are integers selected so that the multiplying signal has an average frequency of approximately $XF_0$.

14. The method of claim 12 wherein generating the multiplying signal comprises selecting integers A, B and N such that $N+(A/B) \approx K/X$.

15. The method of claim 14 wherein generating the multiplying signal further comprises performing the following steps at a rate of $2KF_0$, where $F_0$ is an average frequency of the predetermined BITX signal:
   1) adding A to a first running sum;
   2) producing a squarewave signal having a frequency $KF_0/N$ if the first running sum does not roll over B during step (1);
   3) producing a squarewave signal having a frequency $KF_0/(N+1)$ if the first running sum does roll over B during step (1).

16. The method of claim 14 wherein N=integer part of K/X, $B=2^nK$, and A=Round(B(Frac(K/X))), where n is a number of bits of resolution desired for analog-to-digital conversion.

17. The method of claim 14 wherein $B=Round(2^nXK)$, N=integer part of $K^2 2^n/B$, and $A=K^2 2^n mod(B)$, where n is a number of bits of resolution desired for analog-to-digital conversion.

18. The method of claim 14 wherein B/C=N+(A/B), where C is selected to be less than a predetermined constant and B/C is selected from a Stern-Brocot number tree such that B/C is as close as possible to K/X given the predetermined constant.

19. A method for converting an analog value to a serial digital output value scaled by a product of an arbitrary factor X1 and an arbitrary factor X2, the method comprising performing the following steps to produce each bit of precision of the serial digital output value:
   a) selecting the arbitrary variable factor X1 and the arbitrary variable factor X2;
   b) generating from the factor X1 and from predetermined reference voltage levels for the distinct bit of precision being produced a first multiplying signal having discrete voltage levels scaled by a factor of 1/X1 relative to the predetermined reference voltage levels;
   b) generating from the factor X2 and from a predetermined reference signal for the distinct bit of precision being produced a second multiplying signal having an average frequency scaled by a factor of X2 relative to an avarage frequency of the predetermined reference signal;
   c) applying the first multiplying signal, the second multiplying signal, and the analog signal to a bit serial analog-to-digital converter;
   d) generating at the output of the bit serial analog-to-digital converter an output bit corresponding to the bit of precision of the serial digital output value being produced;
wherein the scalings of the first multiplying signal and the second multiplying signal result in a scaling of the serial digital output value by a factor of X1*X2 relative to the analog value.

20. The method of claim 19 wherein the first multiplying signal has voltage steps of magnitude VN/K and V(N+1)/K, where V is a predetermined voltage step magnitude of the predetermined reference voltage levels, and where N and K are integers selected so that the first multiplying signal has an average slope of approximately T/X, where T is an average slope of the predetermined reference voltage levels.

21. The method of claim 19 wherein generating the first multiplying signal comprises selecting integers A, B and N such that $N+(A/B)\approx K/X1$.

22. The method of claim 21 wherein generating the first multiplying signal further comprises performing the following steps at a rate of $2KF_0$, where $F_0$ is an average frequency of the predetermined reference signal:

1) adding A to a first running sum;
   2) producing a digital number having a value N if the first running sum does not roll over B during step (1);
   3) producing a digital number having a value N+1 if the first running sum does roll over B during step (1);
   4) adding the produced digital number to a second running sum; and
   5) converting the second running sum to a digital number.

23. The method of claim 21 wherein N=integer part of K/X1, $B=2^nK$, and A=Round(B(Frac(K/X1))), where n is a number of bits of resolution desired for analog-to-digital conversion.

24. The method of claim 21 wherein $B=Round(2^nX1K)$, N=integer part of $K^2 2^n/B$, and $A=K^2 2^n mod(B)$, where n is a number of bits of resolution desired for analog-to-digital conversion.

25. The method of claim 21 wherein B/C=N+(A/B), where C is selected to be less than a predetermined constant and B/C is selected from a Stern-Brocot number tree such that B/C is as close as possible to K/X1 given the predetermined constant.

26. The method of claim 19 wherein the second multiplying signal has alternating segments of frequency $KF_0N$ and $KF_0/(N+1)$, where $F_0$ is the average frequency of the predetermined reference signal, and where N and K are integers selected so that the second multiplying signal has an average frequency of approximately $X2F_0$.

27. The method of claim 19 wherein generating the second multiplying signal Comprises selecting integers A, B and N such that $N+(A/B)\approx K/X2$.

28. The method of claim 27 wherein generating the second multiplying signal further comprises performing the following steps at a rate of $2KF_0$, where $F_0$ is an average frequency of the predetermined reference signal:
   1) adding A to a first running sum;
   2) producing a squarewave signal having a frequency $KF_0/N$ if the first running sum does not roll over B during step (1);
   3) producing a squarewave signal having a frequency $KF_0/(N+1)$ if the first running sum does roll over B during step (1).

29. The method of claim 27 wherein N=integer part of K/X2, $B=2^nK$, and A=Round(B(Frac(K/X2))), where n is a number of bits of resolution desired for analog-to-digital conversion.

30. The method of claim 27 wherein $B=Round(2^nX2K)$, N=integer part of $K^2 2^n/B$, and $A=K^2 2^n mod(B)$, where n is a number of bits of solution desired for analog-to-digital conversion.

31. The method of claim 27 wherein B/C=N+(A/B), where C is selected to be less than a predetermined constant and B/C is selected from a Stem-Brocot number tree such that B/C is as close as possible to K/X2 given the predetermined constant.

32. The method of claim 19 implemented in parallel to perform a 2-dimensional separable transform of analog signals derived from an imaging sensor array.

33. An apparatus for converting an analog value to a serial digital output value scaled by an arbitrary factor the apparatus comprising:
   a) means for generating a predetermined BITX signal;
   b) means for selecting the arbitrary factor X;
   c) means for generating from the factor X and from predetermined reference voltage levels for a distinct bit of precision being produced a multiplying signal having discrete voltage levels scaled by a factor of 1/X relative to the predetermined reference voltage levels;

d) means for applying the multiplying signal, the BITX signal, and the analog signal to a bit serial analog-to-digital converter;

e) means for generating at the output of the bit serial analog-to-digital converter an output bit corresponding to the bit of precision of the serial digital output value being produced;

wherein the scaling of the multiplying signal results in a scaling of the serial digital output value by the factor X relative to the analog value.

34. An apparatus for converting an analog value to a serial digital output value scaled by an arbitrary factor X, the apparatus comprising:

a) means for generating a predetermined RAMP signal;

b) means for selecting the arbitrary factor X;

c) means for generating from the factor X and from a predetermined reference signal or a distinct bit of precision being produced a multiplying signal having an average frequency scaled by a factor of X relative to an average frequency of the predetermined reference signal;

d) means for applying the RAMP signal, the multiplying signal, and the analog signal to a bit serial analog-to-digital converter;

e) means for generating at the output of the bit serial analog-to-digital converter an output bit corresponding to the bit of precision of the serial digital output value being produced;

wherein the scaling of the multiplying signal results in a scaling of the serial digital output value by a factor of X relative to the analog value.

35. The apparatus of claim 34 wherein the multiplying signal has alternating segments of frequency $KF^O/N$ and $KF^O/(N+1)$, where $F_O$ is the average frequency of the predetermined reference signal, and where N and K are integers selected so that the multiplying signal has an average frequency of approximately $XF^O$.

36. An apparatus for converting an analog value to a serial digital output value scaled by a product of an arbitrary factor X1 and an arbitrary factor X2, the apparatus comprising:

a) means for selecting the arbitrary variable factor X1 and the arbitrary variable factor X2;

b) means for generating from the factor X1 and from predetermined reference voltage levels for the distinct bit of precision being produced a first multiplying signal having discrete voltage levels scaled by a factor of 1/X relative to the predetermined reference voltage levels;

b) means for generating from the factor X2 and from a predetermined reference signal for the distinct bit of precision being produced a second multiplying signal having an average frequency scaled by a factor of X2 relative to an avarage frequency of the predetermined reference signal;

c) means for applying the first multiplying signal, the second multiplying signal, and the analog signal to a bit serial analog-to-digital converter;

d) means for generating at the output of the bit serial analog-to-digital converter an output bit corresponding to the bit of precision of the serial digital output value being produced;

wherein the scalings of the first multiplying signal and the second multiplying signal result in a scaling of the serial digital output value by a factor of X1*X2 relative to the analog value.

37. An apparatus comprising:

a) an image sensor array producing a plurality of analog signals arranged in rows and columns;

b) a first signal generator producing a plurality of first multiplying signals corresponding to row coefficients;

c) a second signal generator producing a plurality of second multiplying signals corresponding to column coefficients; and d) a plurality of bit serial analog-to-digital converters arranged in rows and columns,
  i) wherein the converters are connected to the image sensor array such that each converter receives one of the analog signals and produces a digital output therefrom,
  ii) wherein each converter uses one of the first multiplying signals and one of the second multiplying signals to perform analog-to-digital conversion, such that the digital output is scaled by a product of the used first multiplying signal and used second multiplying signal,
  iii) wherein first multiplying signals corresponding to distinct row coefficients are used by converters corresponding to distinct rows, and
  iv) wherein second multiplying signals corresponding to distinct column coefficients are used by converters corresponding to distinct columns.

38. An apparatus comprising:

a) an image sensor array producing a plurality of analog signals arranged in rows and columns;

b) a first signal generator producing a plurality of first multiplying signals corresponding to row coefficients;

c) a second signal generator producing a plurality of second multiplying signals corresponding to column coefficients; and d) a plurality of single-slope analog-to-digital converters arranged in rows and columns,
  i) wherein the converters are connected to the image sensor array such that each converter receives one of the analog signals and produces a digital output therefrom,
  ii) wherein each converter uses one of the first multiplying signals and one of the second multiplying signals to perform analog-to-digital conversion, such that the digital output is scaled by a product of the used first multiplying signal and used second multiplying signal,
  iii) wherein first multiplying signals corresponding to distinct row coefficients are used by converters corresponding to distinct rows, and
  iv) wherein second multiplying signals corresponding to distinct column coefficients are used by converters corresponding to distinct columns.

* * * * *